United States Patent
Seo et al.

(10) Patent No.: US 11,497,075 B2
(45) Date of Patent: Nov. 8, 2022

(54) ELECTRONIC DEVICE, BODY-WORN TYPE DEVICE, COMMUNICATION SYSTEM, COMMUNICATION CONTROL METHOD AND STORAGE MEDIUM

(71) Applicant: CASIO COMPUTER CO., LTD., Tokyo (JP)

(72) Inventors: Munetaka Seo, Fussa (JP); Kimiyasu Mizuno, Akishima (JP); Tsuyoshi Minami, Musashimurayama (JP); Shuhei Uchida, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 17/458,790

(22) Filed: Aug. 27, 2021

(65) Prior Publication Data
US 2022/0086937 A1  Mar. 17, 2022

(30) Foreign Application Priority Data

Sep. 11, 2020  (JP) .............................. JP2020-153112

(51) Int. Cl.
*H04W 76/15*  (2018.01)
*H04B 1/3827*  (2015.01)

(52) U.S. Cl.
CPC ............ *H04W 76/15* (2018.02); *H04B 1/385* (2013.01)

(58) Field of Classification Search
CPC ..... H04B 1/385; H04B 1/3833; H04W 76/15; H04M 1/04; H04M 1/725
See application file for complete search history.

(56) References Cited

U.S. PATENT DOCUMENTS

| | | | |
|---|---|---|---|
| 10,305,993 B2 | 5/2019 | Imamura | |
| 2019/0142345 A1* | 5/2019 | DeHennis | ............ A61B 5/7225 600/309 |
| 2020/0178860 A1* | 6/2020 | Masciotti | ................ H04W 4/38 |
| 2020/0359944 A1* | 11/2020 | Raisoni | ................ A61B 5/7405 |
| 2021/0318716 A1* | 10/2021 | Evans | ..................... G06F 1/163 |

FOREIGN PATENT DOCUMENTS

| | | |
|---|---|---|
| JP | 2008011038 A | 1/2008 |
| JP | 2009118403 A | 5/2009 |
| JP | 2014187467 A | 10/2014 |
| JP | 2017046158 A | 3/2017 |

* cited by examiner

*Primary Examiner* — Thanh C Le
(74) *Attorney, Agent, or Firm* — Holtz, Holtz & Volek PC

(57) ABSTRACT

Provided are an electronic device, a body-worn type device, a communication system, a communication controlling method and a storage medium which make it possible to appropriately perform necessary data communication while more reducing power consumption of the body-worn type device.

The electronic device includes a transceiver which performs communication via short-range wireless communication, a memory which stores identification data on each electronic device which is communicable with the body-worn type device via the transceiver, and a processor which, in a case where communication connection is established between any one of the electronic devices which are contained in the identification data and the body-worn type device, operates to perform data transmission and reception between its own device and the body-worn type device via another electronic device that the communication connection with the body-worn type device is established.

15 Claims, 12 Drawing Sheets

US 11,497,075 B2

ELECTRONIC DEVICE, BODY-WORN TYPE DEVICE, COMMUNICATION SYSTEM, COMMUNICATION CONTROL METHOD AND STORAGE MEDIUM

CROSS REFERENCE TO RELATED APPLICATIONS

This application is based upon and claims the benefit of priority under 35 USC 119 of Japanese Patent Application No. 2020-153112 filed on Sep. 11, 2020 the entire disclosure of which, including the description, claims, drawings, and abstract, is incorporated herein by reference in its entirety.

BACKGROUND OF THE INVENTION

1. Field of the Invention

The present invention relates to an electronic device, a body-worn type device, a communication system, a communication controlling method and a storage medium.

2. Description of the Related Art

Nowadays, data transmission and reception are being performed between/among a plurality of electronic devices that a user utilizes via wireless data communication. In particular, in portable electronic devices and so forth, there are cases where direct communication connection is established between/among the portable electronic devices and so forth via Bluetooth (registered trademark) and so forth and data exchange is performed. In such connection, necessity to achieve synchronization of communications sometimes occurs and, for example, Japanese Patent Application Laid Open No. 2009-118403 discloses to control transmission and reception timings as necessary.

For example, in a system of performing communication by establishing the direct communication connection between the electronic device and another device in this way, it becomes also possible to establish communication connection between/among the plurality of devices in parallel with one another simultaneously. However, in a case where the number of devices which are connected to the electronic device at one time is increased, control communication traffic for maintaining each communication connection with each device is increased as the number of devices is increased and therefore there are cases where a load is increased and a delay occurs in response. In particular, in the body-worn type device such as a wristwatch type device that it is difficult to increase battery capacity and power consumption due to problems of battery life, maintenance of continuity of battery operation and so forth, it is requested to suppress the power consumption as much as possible.

SUMMARY OF THE INVENTION

According to one aspect of the present invention, there is provided an electronic device which includes a transceiver which performs communication via short-range wireless communication, a memory which stores identification data on electronic devices which are communicable with a body-worn type device via the transceiver and a processor which, in a case where communication connection is established between the body-worn type device and any one of the electronic devices which are contained in the identification data, makes the transceiver perform data transmission and reception between the own device and the body-worn type device via another electronic device that the communication connection with the body-worn type device is established.

DETAILED DESCRIPTION OF THE INVENTION

In the following, preferred embodiments of the present invention will be described on the basis of the drawings.

First Embodiment

Figure 1:
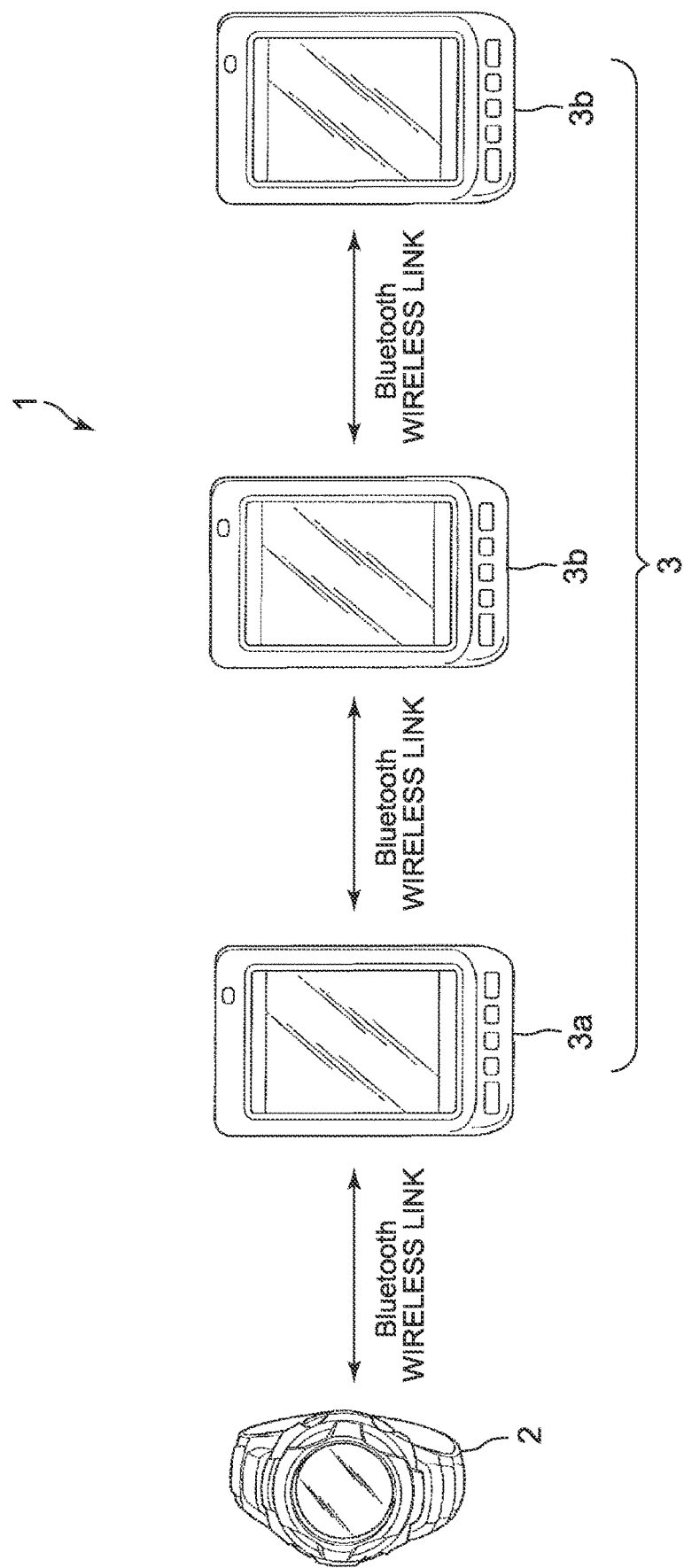
FIG. 1 is an explanatory diagram illustrating one example of a communication system in a first embodiment of the present invention.

FIG. 1 is an explanatory diagram illustrating one example of a communication system 1 in the first embodiment. The communication system 1 includes an arm-worn type device 2 (a body-worn type device) and a plurality of electronic devices 3.

In the example in FIG. 1, the arm-worn type device 2 is a smartwatch. Although there is no specific limitation on the electronic devices 3 and it is not necessary that all the electronic devices 3 be of the same kind, the electronic devices 3 are, for example, smartphones. It is possible for the arm-worn type device 2 and the electronic devices 3 to mutually communicate via Bluetooth (registered trademark).

In the communication system 1, it is possible to connect one electronic device 3a to the arm-worn type device 2 so as to communicate with each other via Bluetooth and other electronic devices 3b are serially connected to the electronic device 3a and data transmission and reception are performed between the arm-worn type device 2 and each electronic device 3b via the electronic device 3a. That is, all pieces of data which are exchanged between/among the three electronic devices 3 (3a and 3b) and the arm-worn type device 2 are transmitted to and received from the arm-worn type device 2 via the electronic device 3a. There is no specific limitation on the number of the electronic devices 3b to be connected.

The electronic device 3a receives data which is to be sent to the arm-worn type device 2 from the electronic device(s) 3b and transmits the received data to the arm-worn type device 2 and receives data which is to be sent to the electronic device(s) 3b from the arm-worn type device 2 and transmits the received data to the electronic device(s) 3b.

Figure 2:
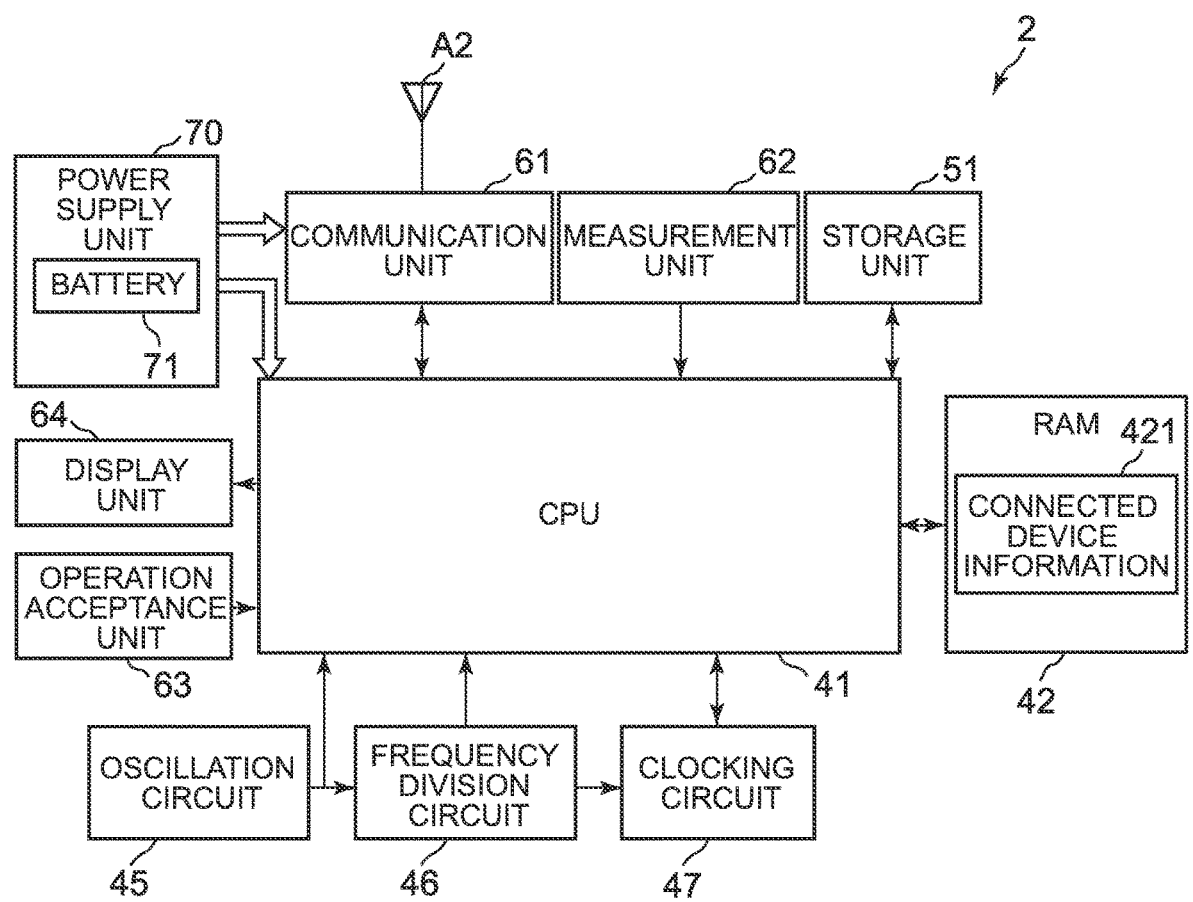
FIG. 2 is a block diagram illustrating one example of a functional configuration of an arm-worn type device.

FIG. 2 is a block diagram illustrating one example of a functional configuration of the arm-worn type device 2.

The arm-worn type device 2 includes a CPU 41 (Central Processing Unit) (a second control unit), a RAM 42 (Random Access memory), an oscillation circuit 45, a frequency division circuit 46, a clocking circuit 47, a storage unit 51, a communication unit 61 (a second communication unit), an antenna A2, a measurement unit 62, an operation reception unit 63, a display unit 64, a power supply unit 70 and so forth.

The CPU 41 is a hardware processor which performs various controlling operations. The CPU 41 performs arithmetic processing and totally controls operations of the arm-worn type device 2.

The RAM 42 provides the CPU 41 with a memory space to be used for work and temporarily stores data. Connected device information 421 is stored in the RAM 42. The connected device information 421 contains a security key (a permanent key) which pertains to bonding/pairing with each electronic device 3 which is connected to communicate with the arm-worn type device 2. Incidentally, in a case where power supply to the RAM 42 is stopped, the connected device information 421 may be stored into a nonvolatile memory in the storage unit 51.

The oscillation circuit 45 has oscillation elements and generates and outputs a predetermined frequency signal.

The frequency division circuit 46 converts the frequency signal which is output from the oscillation circuit 45 to a signal of a frequency which is appropriate to be utilized in the arm-worn type device 2 and outputs the converted frequency signal to the clocking circuit 47.

The clocking circuit 47 acquires one of the frequency signals which are input from the frequency division circuit 46, counts elapsed time and outputs the current date and time. RTC (Real Time Clock) may be included in the clocking circuit 47.

The storage unit 51 stores and retains programs and various setting data. The storage unit 51 is a nonvolatile memory, a ROM (Read Only Memory) and so forth and the programs and the various setting data are read out of the storage unit 51 by the CPU 41 to be utilized.

The communication unit 61 performs Bluetooth-based communication with the external electronic devices 3 via the antenna A2. Although there is no specific limitation on the Bluetooth communication standard to be used, in the following, description will be made mainly on the assumption that the Low Energy standard (BLE: Bluetooth Low Energy) which is contained in versions which come after the Bluetooth Version 4.0 is used. The communication unit 61 accepts power supply from the power supply unit 70 independently of the CPU 41 and therefore it becomes possible for the communication unit 61 to periodically transmit and receive control data which is used for minimum maintenance of communication connection which is established between the arm-worn type device 2 and the external electronic device 3 at predetermined intervals even in a state where the operation of the CPU 41 is stopped. In addition, in a case where data other than the data which pertains to maintenance of the communication connection is received from the external electronic device 3, the communication unit 61 works to restart the operation of the CPU 41.

The measurement unit 62 measures various physical amounts and so forth. Although there is no specific limitation on objects which are measurable for the measurement unit 62, the objects are, for example, some of or all the states of its own device such as acceleration, terrestrial magnetism (an azimuth direction) and so forth, a temperature, an illuminance and so forth of its surrounding environment, biological information such as a pulse rate and so forth of a user who wears the arm-worn type device 2.

The operation acceptance unit 63 accepts an operation which is input from the outside by a user or anyone else and outputs the operation to the CPU 41 as an input signal. The operation acceptance unit 63 has, for example, a push button switch, a touch panel and so forth. The touch panel is placed in a state of being superposed on a display screen of the display unit 64. The operation acceptance unit 63 may further have other switches, a crown and so forth.

The display unit 64 performs various display operations on the display screen under the control of the CPU 41. The display screen is, for example, a liquid crystal display screen (LCD) and so forth.

The power supply unit 70 supplies power to respective units of the arm-worn type device 2. The power supply unit 70 has a battery 71 and thereby it becomes possible to supply the power to the respective units at operating voltages of the respective units. The battery 71 is a secondary battery such as, for example, a lithium-ion battery and so forth. Alternatively, the power supply unit 70 may not have the battery 71 and may be of the type that a detachable and replaceable battery (such as a coin-type battery and so forth) is attached to the power supply unit 70 and supplies the power to the respective units.

Figure 3A:
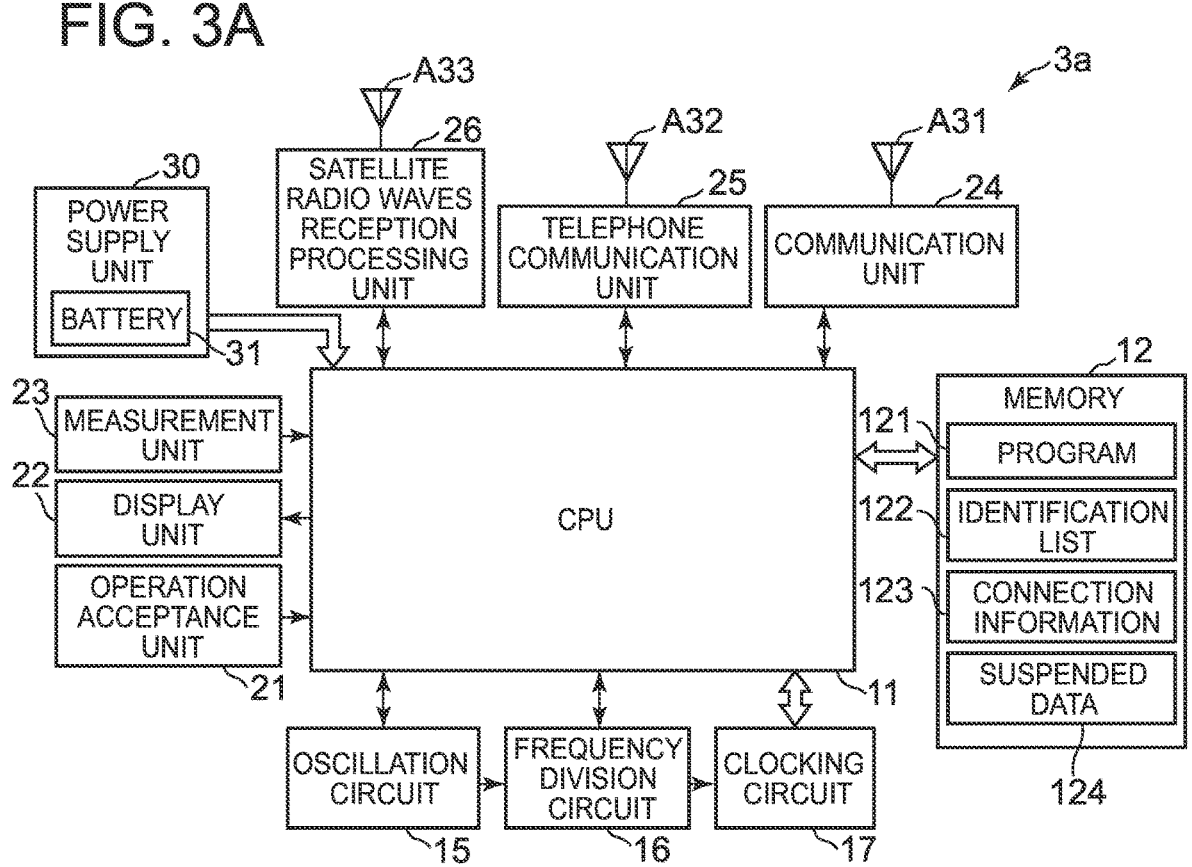
FIG. 3A is a block diagram illustrating one example of a functional configuration of one electronic device.
Figure 3B:
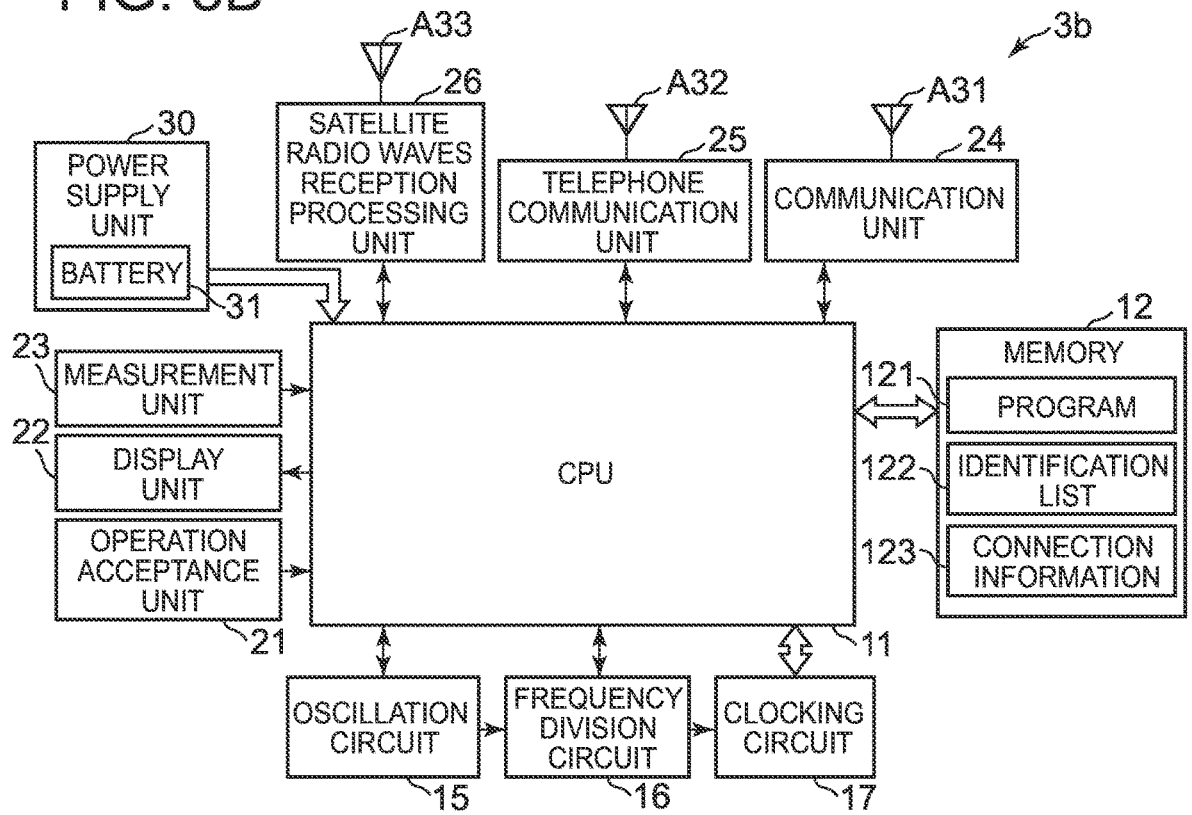
FIG. 3B is a block diagram illustrating one example of a functional configuration of another electronic device.

FIG. 3A is a block diagram illustrating one example of a functional configuration of the electronic device 3a and FIG. 3B is a block diagram illustrating one example of a functional configuration of the electronic device 3b. The configuration of the electronic device 3b is the same as the configuration of the electronic device 3a except a point that suspended data 124 is not stored in a memory 12. Here, the functional configurations of the electronic devices 3 (3a and 3b) will be described all together by describing the functional configuration of the electronic device 3a on the basis of FIG. 3A.

The electronic device 3a includes a CPU 11 (a control unit), the memory 12 (the storage unit), an oscillation circuit 15, a frequency division circuit 16, a clocking circuit 17, an operation acceptance unit 21, a display unit 22, a measurement unit 23, a communication unit 24 and an antenna A31, a telephone communication unit 25 and an antenna A32, a satellite radio waves reception processing unit 26 and an antenna A33, a power supply unit 30 and so forth.

The CPU 11 is a hardware processor which performs various arithmetic processing and thereby totally controls the operation of the smartphone.

The memory 12 includes a RAM, a nonvolatile memory and so forth. The RAM provides the CPU 11 with a memory space to be used for work and stores temporary data. The nonvolatile memory stores a program 121 and setting data. An identification list 122 (identification data) and connection information 123 are contained in the setting data. Suspended data 124 is contained in the temporary data.

An application program which is used to control communication with the arm-worn type device 2 via Bluetooth is contained in the program 121. It may be possible to download the application program and updated data thereof at any time from a website and so forth which relate to the arm-worn type device 2 on the Internet. The application program and the updated data thereof may be downloaded by the electronic device 3 and may be appropriately transferred to the arm-worn type device 2 via Bluetooth. In addition, since it is possible for the arm-worn type device 2 to perform communication via a wireless LAN (Local Area Network), the arm-worn type device 2 may download the application program and the updated data thereof directly from the website and so forth on the Internet.

Identification information and connection order information (connection order data) on the electronic devices 3 which are connectable and communicable with the arm-worn type device 2 are listed and stored in the identification list 122 in list form. The identification information may contain security key (permanent key) data which pertains to bonding (pairing) with the arm-worn type device 2. Identification information on the electronic device 3 which is directly connected to the arm-worn type device 2 side (the upstream side of the own device (the electronic device 3a)) and identification information on the electronic device 3 which is directly connected to the side (the downstream side of the own device) which is opposite to the arm-worn type device 2 are respectively stored in their memories 12 as the connection information 123. In a case where the own device is the electronic device which is located on the downmost stream side, information on the electronic device 3 which is located on the downstream side of the own device is not retained.

In the electronic device 3a, the suspended data 124 means data which is temporarily retained in the memory 12 until it is transmitted in a case where the data is not transferred to the arm-worn type device 2 at once as will be described later.

The oscillation circuit 15 has oscillation elements and generates and outputs a predetermined frequency signal.

The frequency division circuit 16 converts the frequency signal which is output from the oscillation circuit 15 to a signal of a frequency which is appropriate to be utilized in the electronic device 3a and outputs the converted frequency signal to the clocking circuit 17.

The clocking circuit 17 acquires one of the frequency signals which are input from the frequency division circuit 16, counts elapsed time and outputs the current date and time to the CPU 11. The clocking circuit 17 may hold data on the date and time that the CPU 11 counts and an RTC (Real-Time Clock) may be included in the clocking circuit 17.

The operation acceptance unit 21 accepts the operation which is input from the outside by the user or anyone else and outputs the operation as an input signal to the CPU 11. The operation acceptance unit 21 has, for example, a push button switch, a touch panel and so forth. The touch panel is placed in a state of being superposed on a display screen of the display unit 22. The operation acceptance unit 21 may further have other slide switches and so forth.

The display unit 22 performs various display operations on the display screen under the control of the CPU 11. The display screen is, for example, a liquid crystal display screen (LCD) and so forth. In addition, the display unit 22 may have an LED (Light Emitting Diode) and so forth. The LED may be turned on or off in accordance with contents which are displayed such as the operating conditions, a charged state and so forth and may be capable of being lighted in different colors.

The measurement unit 23 measures various physical amounts and so forth. Although there is no specific limitation on objects which are measurable for the measurement unit 23, for example, states of its own device such as acceleration, terrestrial magnetism (an azimuth direction) and so forth and a temperature, a luminance and so forth of its surrounding environment may be given as the objects.

It is possible for the communication unit 24 to perform Bluetooth-based communication via the antenna A31. That is, the communication unit 24 is made communicable with the communication unit 61 of the arm-worn type device 2 on the basis of Bluetooth transmission and reception standards. In addition, the communication unit 24 may be also made communicable with the communication unit 61 via a wireless LAN (Local Area Network) and so forth.

The telephone communication unit 25 establishes communication connection with a base station via the antenna A32 and performs telephone communication.

The satellite radio waves reception processing unit 26 receives radio waves from a positioning satellite which pertains to a satellite positioning system such as a GPS (Global Positioning System) and so forth via the antenna A33 and calculates a current position of the electronic device 3a.

Operations of the communication unit 24, the telephone communication unit 25 and the satellite radio waves reception processing unit 26 may be stopped all at once in a case of setting an airplane mode and so forth. In addition, the operations of the respective units 24, 25 and 26 may be stopped respectively and operation frequencies thereof may be defined in accordance with more independent settings.

The power supply unit 30 supplies power to the respective units of the electronic device 3a from a battery 31. The battery 31 is a secondary battery such as, for example, a lithium-ion battery and so forth and charging becomes possible by connecting charging wiring to a connection terminal. The battery 31 may be detachable and replaceable. In addition, in a case where the charging wiring is connected to the connection terminal, the power which is supplied through the charging wiring may be supplied to the respective units, not depending on a charged state of the battery 31.

Next, a communication operation of the communication system 1 in the first embodiment will be described.

As described above, in the communication system 1, the number of the electronic devices 3 to be directly connected to the arm-worn type device 2 is limited to one and in a case where data transmission and reception are performed among/between the arm-worn type device 2 and the plurality of electronic devices 3, data transmission and reception between the arm-worn type unit 2 and other electronic devices 3b are performed via the electronic device 3a which is directly connected to the arm-worn type device 2. Accordingly, frequency of control data exchange for maintenance of communication is limited to only the frequency of control data exchange between the arm-worn type device 2 and the electronic device 3a and the frequency is not changed even in a case where the number of electronic devices 3 which are used for data transmission and reception is increased.

The electronic device 3a which is directly connected to the arm-worn type device 2 may not be limited to one specific electronic device 3. In a case where data transmission and reception are performed between the arm-worn type device 2 and any one (a target electronic device) of the electronic devices 3 in a state where the electronic device that communication connection with the arm-worn type device 2 is established is absent, the electronic device 3a is set as the target electronic device. In a case where the communication connection is already established between the arm-worn type device 2 and another electronic device 3 which is contained in the identification list 122, the electronic device 3b is set as the target electronic device and data transmission and reception are performed between the arm-worn type device 2 and the electronic device 3b via that another electronic device 3.

In data transmission and reception between the arm-worn type device 2 and each electronic device 3, it is possible to establish the communication connection by setting the upstream-side electronic device 3 and the downstream-side electronic device 3 one by one. The downmost-stream-side electronic device 3 which is so set that data transmission and reception to and from the arm-worn type device 2 become lastly possible at a certain point of time searches for another electronic device 3 (a third electronic device) which does not yet become possible in data transmission and reception to and from the arm-worn type device 2 at appropriate intervals, in a case where the third electronic device 3 is found, the downmost-stream-side electronic device 3 establishes the communication connection with the third electronic device 3 and sets the third electric device as the electronic device 3 which is located on the downstream side of itself. In a case where the data transmission and reception to and from the arm-worn type device 2 are started, the third electronic device 3 establishes the communication connection with the downmost-stream-side electronic device 3 (a second electronic device). In a case where there exists no electronic device 3 on the downstream side of the electronic device 3a (a first electronic device) which is connected to the arm-worn type device 2, the first electronic device 3a and the second electronic device 3 are identical with each other in current positional relation for the third electronic device which is not yet connected at that time. In a case where three or more electronic devices 3 are to be mutually connected, data on each downstream-side electronic device 3 is transmitted to and received from the arm-worn type device 2 via all the upstream-side electronic devices 3. That is, each upstream-side electronic device 3 transfers data which is sent out and transferred from the electronic devices 3 (including the third electronic device) which are located on the downstream side of itself to the more upstream side and transfers data that each electronic device 3 (including the third electronic device) which is located on the upstream side of itself receives and transfers to the downstream side. In a case where the number of the electronic devices 3 is large, a slight time lug would arise from when the data is firstly transmitted to when the data finally reaches the target electronic device 3. In addition, the more the electronic device 3 is located on the upstream side, the more the frequency that the electronic device 3 transfers the data is increased.

In a case where there emerges one electronic device 3 (a released electronic device) which suspends data transmission and reception to and from the arm-worn type device 2 and releases the communication connection with the upstream-side and downstream-side electronic devices 3 (or the arm-worn type device 2), serial connection is maintained by establishing the communication connection between the upstream-side and downstream-side electronic devices 3 that the communication connection with the released electronic device 3 is released. In a case where the released electronic device restarts data transmission and reception again, the released electronic device 3 is re-connected to the downstream side of the electronic device 3 which is the second electronic device 3 at that time point.

Figure 4:
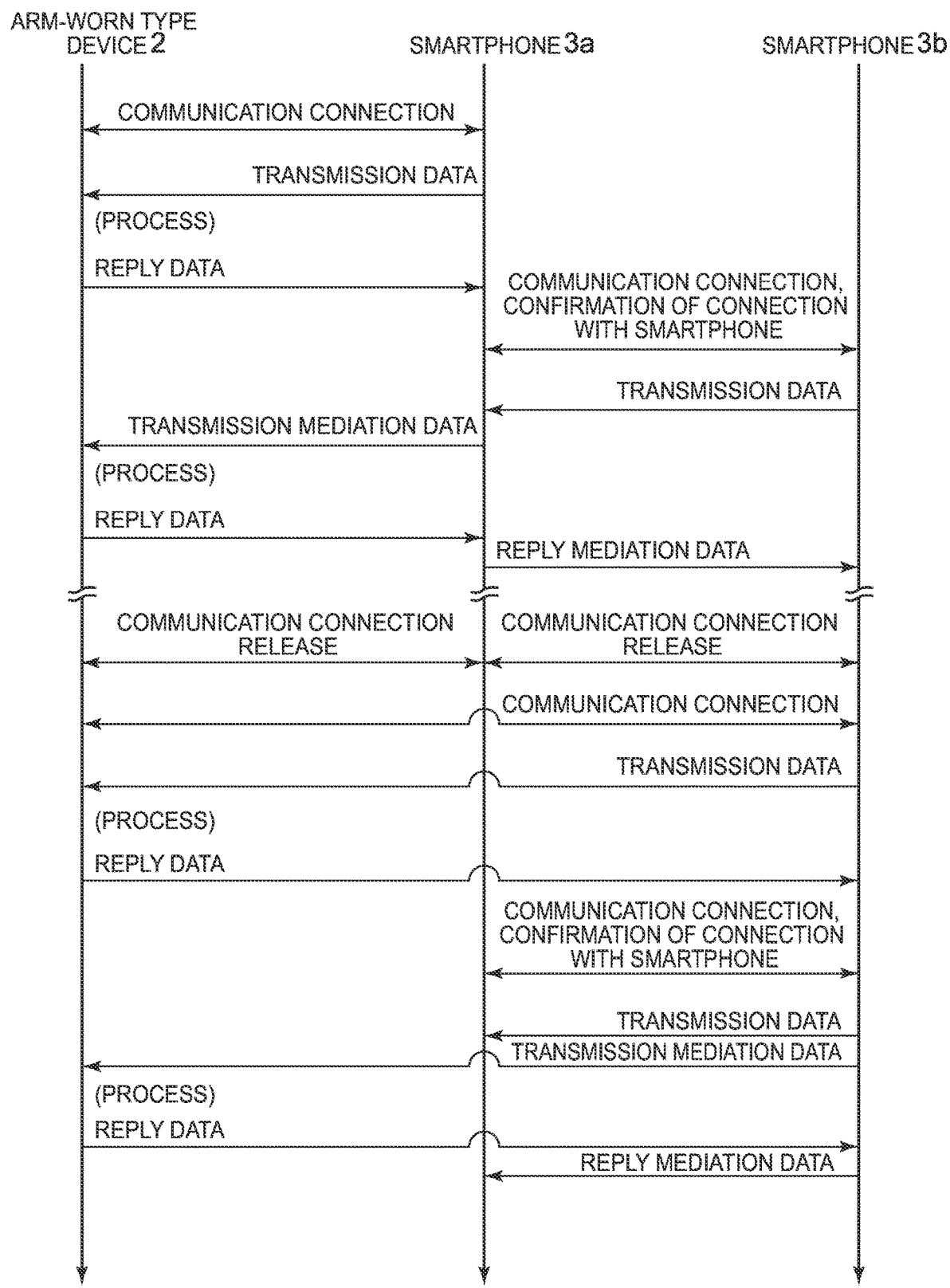
FIG. 4 is a sequence diagram illustrating one example of a flow of communication between/among the arm-worn type device and two electronic devices.

FIG. 4 is a sequence diagram illustrating one example of a flow of communication between/among the arm-worn type device 2 and two electronic devices 3.

In a case where both the arm-worn type device 2 and the electronic device 3a enter communicable states, for example, the arm-worn type device 2 is set as a slave (a peripheral device) and the electronic device 3a is set as a master (a central device), the electronic device 3a receives an advertisement from the arm-worn type device 2 or the arm-worn type device 2 receives a request from the electronic device 3a and responds to the request and thereby the communication connection is established between the arm-worn type device 2 and the electronic device 3a. In a case where the communication connection is established between the arm-worn type device 2 and the electronic device 3a, communication is performed between the arm-worn type device 2 and the electronic device 3a at predetermined intervals. The arm-worn type device 2 does not execute advertising while the communication connection with the electronic device 3a is being established and does not accept a connection request from other electronic devices 3 (no communication connection is performed).

On the other hand, in a case where the electronic device 3b enters a state of being communicable with the arm-worn type device 2 and the electronic device 3a, the electronic device 3b is first connected to communicate with the electronic device 3a and confirms whether the electronic device 3a is connected to communicate with the arm-worn type device 2 and other smartphones. In the example in FIG. 4, since the electronic device 3a is connected to communicate with only the arm-worn type device 2 via Bluetooth, the electronic device 3b is set to maintain the communication connection with the electronic device 3a and to perform data transmission and reception together with the arm-worn type device 2 via the electronic device 3a. Although in the communication connection between the electronic devices 3, either one of the electronic devices 3 may be set as the master or the slave, for example, the upstream-side electronic device 3 may be defined as the master. Even in a case where each electronic device 3 is connected to communicate with other external devices separately via Bluetooth with no relation to the arm-worn type device 2, this point (which is which) may not be taken into consideration.

That is, data which is to be transmitted from the electronic device 3b to the arm-worn type device 2 is first transmitted from the electronic device 3b to the electronic device 3a. The electronic device 3a receives this data and then performs a first transfer operation of transmitting (transferring) the data to the arm-worn type device 2 at an appropriate timing.

Data which is to be transmitted (replied) from the arm-worn type device 2 to the electronic device 3b is first sent from the arm-worn type device 2 to the electronic device 3a. The electronic device 3a receives this data and then performs a second transfer operation of transmitting (transferring) the data to the electronic device 3b. Data transmission between the electronic devices 3 may be performed with no delay.

In a case where data transmission and reception between the arm-worn type device 2 and the electronic device 3b is to be terminated, the communication connection between the electronic devices 3a and 3b may be simply released and, as a result, communication is simply returned to one-to-one communication between the arm-worn type device 2 and the electronic device 3a.

On the other hand, in a case where data transmission and reception between the arm-worn type device 2 and the electronic device 3a is to be terminated, the electronic device 3a releases not only the communication connection with the arm-worn type device 2 but also the communication connection with the electronic device 3b. The electronic device 3b directly establishes the communication connection between itself and the arm-worn type device 2 starts one-to-one communication with the arm-worn type device 2.

In a case where the electronic device 3a is to be again connected to communicate with other electronic devices 3, the electronic device 3a establishes the communication connection between itself and the electronic device 3b and confirms whether the electronic device 3b is connected to the arm-worn type device 2 and other electronic devices 3. In the example in FIG. 4, since the electronic device 3b is connected to only the arm-worn type device 2, the electronic device 3a is set to maintain the communication connection with the electronic device 3b and to perform data transmission and reception between itself and the arm-worn type device 2 via the electronic device 3b. That is, data which is to be transmitted from the electronic device 3a to the arm-worn type device 2 is first transmitted to the electronic device 3b and then the electronic device 3b transmits the data to the arm-worn type device 2 at an appropriate timing. Data which is to be transmitted (replied) from the arm-worn type device 2 to the electronic device 3a is first transmitted to the electronic device 3b and then is transferred from the electronic device 3b to the electronic device 3a.

That is, the electronic device 3 which is directly connected to the arm-worn type device 2 may be changed depending on a situation. Incidentally, in a case where when execution of a communication operation of the arm-worn type device 2 is started, the plurality of electronic devices 3 simultaneously becomes communicable with the arm-worn type device 2, each electronic device 3 may search for the arm-worn type device 2 and other electronic devices 3 and/or may operate in other ways at predetermined intervals in such a manner that one electronic device 3 which is higher than others in connection order in the identification list 122 is preferentially connected to the arm-worn type device 2 in principle.

Figure 5:
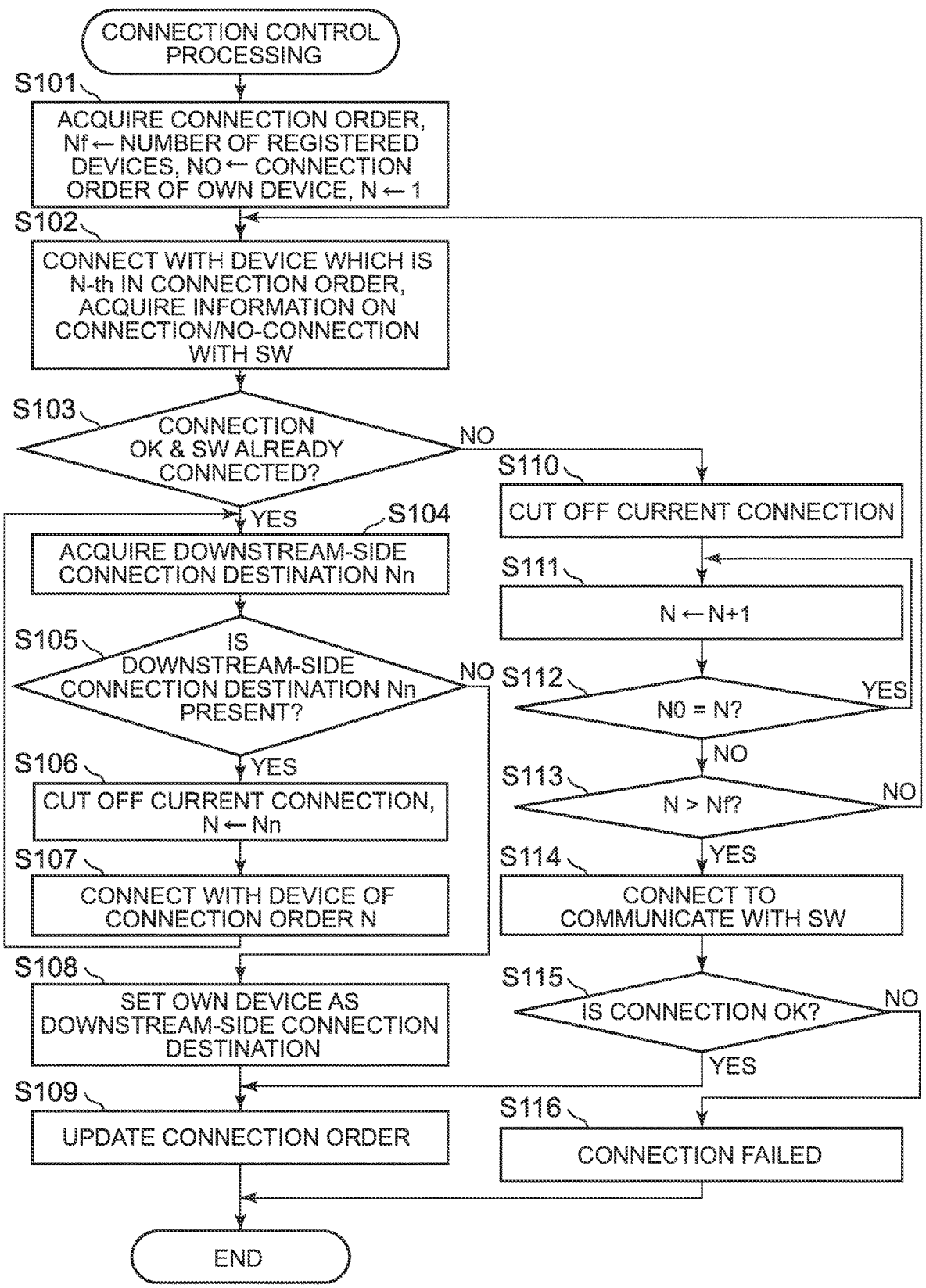
FIG. 5 is a flowchart illustrating one example of a control procedure of connection control processing which is executed by the electronic device.

FIG. 5 is a flowchart illustrating one example of a control procedure by the CPU 11 in connection control processing that each electronic device 3 executes. An application program which relates to communication connection with the arm-worn type device 2 is launched and thereby execution of the connection control processing is started. For example, in a case where the operation of the electronic device 3 is started, in a case where the operation of the communication unit 24 of the electronic device 3 is started and in a case where the application program is designated and manually launched by an inputting operation and so forth into the operation acceptance unit 21, execution of the connection control processing is started.

In a case where execution of the connection control processing is started, the CPU 11 acquires the identification list 122 and sets the number Nf of registered electronic devices which are connectable to the arm-worn type device 2 and the connection order NO of the own device. In addition, the CPU 11 sets a value of a variable N to "1" (step S101).

The CPU 11 makes the own device communicate with the electronic device 3 which is the variable N in the connection order via the communication unit 24. In a case where the own device is connected to communicate with the N-th electronic device 3, the CPU 11 acquires information on whether the N-th electronic device 3 is connected to communicate with the arm-worn type device 2 (the smartwatch) (step S102).

The CPU 11 decides whether the own device is connected to communicate with the N-th electronic device 3 and whether the N-th electronic device 3 is connected to communicate with the arm-worn type device 2 (step S103). In a case where it is decided that both the communication connection between the own device and the N-th electronic device 3 and the communication connection between the arm-worn type device 2 and the N-th electronic device 3 are established ("YES" in step 103), the CPU 11 acquires the identification information (the connection order Nn) on another electronic device 3 which is connected to the downstream side of the N-th electronic device 3 (step S104). The CPU 11 decides whether the Nn-th electronic device 3 is connected to the downstream side of the N-th electronic device 3 (step S105). In a case where it is decided that the Nn-th electronic device 3 is connected to the downstream side of the N-th electronic device 3 ("YES" in step S105), the CPU 11 releases the current communication connection and changes the variable N to Nn (step S106). The CPU 11 makes the own device connect to communicate with the electronic device 3 which is N in connection order (step S107). Then, the CPU 11 returns to the process in step S104.

In a case where it is decided that the Nn-th electronic device 3 is not connected to the downstream side of the N-th electric device in step S105 ("NO" in step S105), the CPU 11 decides the own device as the downstream side connection destination of the N-th electronic device 3 and maintains the current connection state (step S108). The CPU 11 updates the connection order (step S109). The CPU 11 may acquire information on the current connection order from the upstream-side electronic device 3. The connection order of the own device is changed such that the own device comes after the electronic device 3 which was connected to the upstream side of the own device before. The connection order becomes the same as the order of the electronic devices 3 which are currently connected in series following the arm-worn type device 2 by updating the connection order in this way. In a case where there exists any electronic device 3 which is excluded from the past connection order because of connection of the own device (that is, in a case where there exists one electronic device 3 which is connected in order which is different from the order which is originally indicated in the identification list 122), the connection order of that electronic device 3 is shifted to the rearmost (at least, to the downstream side of the own device) (in a case where there exists the plurality of electronic devices 3 which is excluded from the past connection order, connection orders of these electronic devices 3 are shifted to and added to the rearmost altogether in order of the past connection order). In addition, information on this connection order may be transmitted to each upstream-side electronic device 3. The CPU 11 reflects the acquired connection order in the identification list 122. In addition, the CPU 11 updates the connection information 123. Then, the CPU 11 terminates execution of the connection control processing.

In a case where it is decided that the own device is not connected to the electronic device 3 which is N in connection number or the electronic device 3 which is connected to the own device is not connected to the arm-worn type device 2 (the smartwatch) in the decision process in step S103 ("NO" in step S103), the CPU 11 releases current connection of the own device with that electronic device 3 (step S110).

The CPU 11 adds "1" to the variable N (step S111). The CPU 11 decides whether the variable N is equal to the connection order NO of the own device (step S112). In a case where it is decided that the variable N is equal to the connection order NO of the own device ("YES" in step S112), the CPU 11 returns to the process in step S111 and further adds "1" to the variable N.

In a case where it is decided that the variable N is not equal to the connection order NO of the own device ("NO" in step S112), the CPU 11 decides whether the variable N is larger than the number of registered devices Nf (step S113). In a case where it is decided that the variable N is not larger than the number of registered devices Nf (less than the number of registered devices Nf) ("NO" in step S113), the CPU 11 returns to the process in step S102.

In a case where it is decided that the variable N is larger than the number of registered devices Nf ("YES" in step S113), the CPU 11 makes the own device connect to directly communicate with the arm-worn type device 2 (the smartwatch) via the communication unit 24 (step S114). The CPU 11 decides whether the own device succeeds in establishment of connection with the arm-worn type device 2 (OK or not) (step S115). In a case where it is decided that the own device succeeds in establishment of connection with the arm-worn type device 2 ("YES" in step S115), the CPU 11 shifts to a process in step S109. In a case where it is decided that the own device does not succeed (fails) in establishment of connection with the arm-worn type device 2 ("NO" in step S115), the CPU 11 recognizes that the own device fails in establishment of connection with the arm-worn type device 2 (step S116) and terminates execution of the connection control processing.

Figure 6:
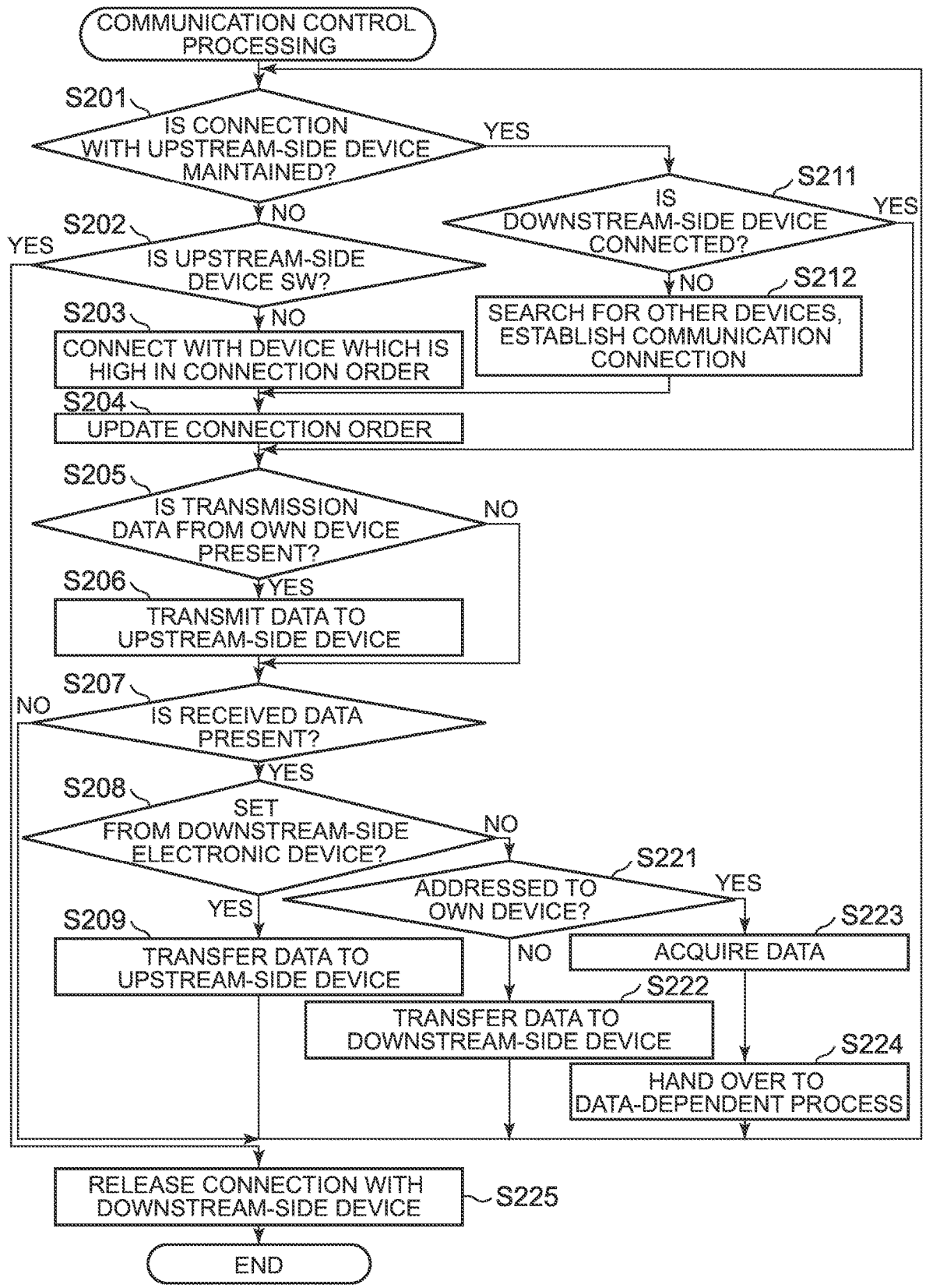
FIG. 6 is a flowchart illustrating one example of a control procedure of communication control processing which is executed by the electronic device.

FIG. 6 is a flowchart illustrating one example of a control procedure by the CPU in communication control processing that the electronic device 3 executes. Execution of this communication control processing is started subsequently to establishment of the communication connection between the own device and another electronic device 3 and/or the arm-worn type device 2 by execution of the connection control processing.

In a case where execution of the communication control processing is started, the CPU 11 decides whether the communication connection with the device which is connected to the upstream side of the own device is maintained (step S201). In decision of maintenance of the communication connection, it is decided whether the communication connection is released in accordance with an explicit connection release request or whether the communication connection is released because of time-out due to communication disruption which lasts in excess of a predetermined base time and temporary and short-time communication disconnection and so forth may not be taken into consideration. In a case where it is decided that the communication connection is not maintained ("NO" in step S201), the CPU 11 decides whether the upstream side device is the arm-worn type device 2 (the smartwatch) (step S202). In a case where it is decided that the upstream side device is the arm-worn type device 2 ("YES" in step S202), the CPU 11 makes the own device release also connection with the downstream-side electronic device 3 via the communication unit 24 (step S225) and terminates execution of the communication control processing.

In a case where it is decided that the upstream-side device is not the arm-worn type device 2 ("NO" in step S202), the CPU 11 operates to connect the own device to communicate with one electronic device 3 which is higher than the upstream-side electronic device further by "1" in connection order (step S203). The CPU 11 updates the connection order (step S204). Information on the updated connection order (only an updated part is also allowable) may be appropriately transmitted to higher-order and lower-order electronic devices 3. In addition, the CPU 11 updates the connection information 123. Then, the CPU 11 shifts to a process in step S205.

In a case where it is decided that the communication connection between the own device and the upstream-side electronic device 3 is maintained in the decision process in step S201 ("YES" in step S201), the CPU 11 decides whether there exists the electronic device 3 which is connected to the downstream side of the own device (step S211). In a case where it is decided that there exits the electronic device 3 which is connected to the downstream side of the own device ("YES" in step S211), the CPU 11 shifts to the process in step S205. In a case where it is decided that the electronic device 3 is not connected to the downstream side of the own device ("NO" in step S211), the CPU 11 searches for another electronic device 3 and in a case where that another electronic device 3 is detected, the CPU 11 makes the own device establish the communication connection with the detected electronic device 3 (step S212). In a case where the plurality of electronic devices 3 is detected simultaneously, the CPU 11 operates to select one electronic device 3 which is the highest in connection order and makes the own device establish the communication connection with the selected electronic device 3. Then, the CPU 11 shifts to the process in step S204. In a case where the electronic device 3 is not detected, the CPU 11 may shift to the process in step S205, skipping the process in step S204.

Incidentally, in a case where the electronic device 3 is newly connected in series with the own device as described above, the information on the connection order is transmitted to the electronic devices which are located on the upstream side of that series-connected electronic device 3 in order and therefore the CPU 11 may simply update the identification list 122 in accordance with the information which is transmitted in this way.

Shifting to the process in step S205, the CPU 11 decides whether there exists transmission data to be sent from the own device to the arm-worn type device 2 (step S205). In a case where it is decided that there exists the transmission data ("YES" in step S205), the CPU 11 makes the own device transmit the transmission data to the upstream-side electronic device 3 which is connected to the own device via the communication unit 24 (step S206). Then, the CPU 11 shifts to a process in step S207. In a case where it is decided that there exists no transmission data ("NO" in step S205), the CPU 11 shifts to the process in step S207.

Shifting to the process in step S207, the CPU 11 decides whether there exists data which is received via the communication unit 24 (step S207). In a case where it is decided that there exists no received data ("NO" in step S207), the CPU 11 returns to the process in step S201.

In a case where it is decided that there exists the received data ("YES" in step S207), the CPU 11 decides whether a transmission source of the received data is the downstream-side electronic device 3 (the electronic device 3b) (step S208). In a case where it is decided that the transmission source is the downstream-side electronic device 3 (the electronic device 3b) ("YES" in step S208), the CPU 11 transfers the received data to the upstream-side device (step S209). Then, the CPU 11 returns to the process in step S201.

In a case where it is decided that the transmission source of the received data is not the downstream-side electronic device (the electronic device 3b) by execution of a decision process in step S208 ("NO" in step S208), the CPU 11 decides whether the received data is addressed to the own device (step S221). In a case where it is decided that the received data is not addressed to the own device ("NO" in step S221), the CPU 11 transfers the received data to the downstream-side electronic device (the electronic device 3b) (step S222). Then, the CPU 11 returns to the process in step S201.

In a case where it is decided that the received data is addressed to the own device by execution of a decision process in step S221 ("YES" in step S221), the CPU 11 acquires the received data (step S223) and hands over the received data to an appropriate process program in accordance with contents of the received data (step S224). Then, the CPU 11 returns to the process in step S201.

Figure 7:
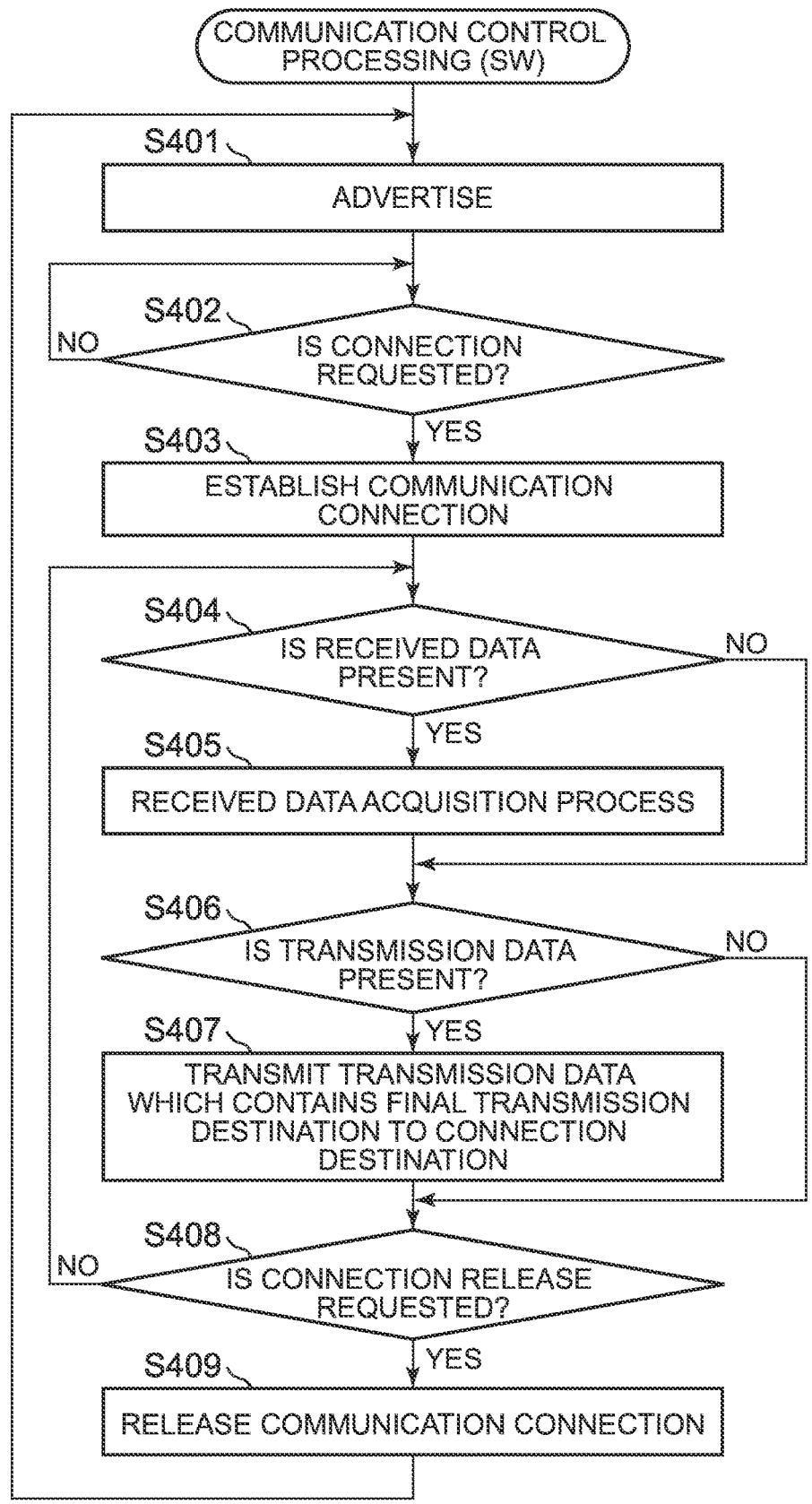
FIG. 7 is a flowchart illustrating one example of a control procedure of communication control processing which is executed by the arm-worn type device.

FIG. 7 is a flowchart illustrating one example of a control procedure by the CPU 14 in communication control processing that the arm-worn type device 2 executes. In a case where the operation of the arm-worn type device 2 is started, in a case where a prohibition on the communication operation is removed, in a case where a start command which is issued from the user and anyone else is explicitly acquired from the outside and in any other cases, execution of the communication control processing is started.

In a case where execution of the communication control processing is started, the CPU 41 makes the own device execute advertising via the connection unit 61 thereby to make advertisement detection possible for the electronic devices 3 which are connectable to the own device (step S401). In a mode other than BLE (Bluetooth Low Energy), the CPU 41 may stand by for connection of the electronic devices 3, with the communication unit 61 being brought into a request detectable state. The CPU 41 decides whether a connection request is made from any one of the electronic devices 3 (step S402). In a case where it is decided that no connection request is made ("NO" in step S402), the CPU 41 returns to the process in step S401. The process in step S401 may be executed not continuously but intermittently at appropriate intervals.

In a case where it is decided that the connection request is made from one electronic device 3 ("YES" in step S402), the CPU 41 makes the own device establish the communication connection with that electronic device 3 (step S403).

The CPU 41 decides whether there exists the received data which is sent from that electronic device 3 (step S404). In a case where it is decided that there exists the received data ("YES" in step S404), the CPU 41 operates to acquire the contents of the received data and to hand over the received data to a process which corresponds to the acquired contents of the received data (step S405). Then, the CPU 41 shifts to a process in step S406. In a case where it is decided that there exists no received data ("NO" in step S404), the CPU 41 shifts to the process in step S406.

Shifting to the process in step S406, the CPU 41 decides whether there exists transmission data to be transmitted to that electronic device 3 (step S406). In a case where it is decided that there exists the transmission data ("YES" in step S406), the CPU 41 operates to transmit the transmission data to that electronic device 3 which is connected to the own device by adding identification information for specifying the final transmission destination to the transmission data (step S407). Then, the CPU 41 shifts to a process in step S408. In a case where it is decided that there exists no transmission data in the decision process in step S406 ("NO" in step S406), the CPU 41 shifts to the process in step S408.

Shifting to the process in step S408, the CPU 41 decides whether a connection release request is made from the electronic device 3 which is a connection destination (step S408). In a case where it is decided that no connection release request is made from that electronic device 3 ("NO" in step S408), the CPU 41 returns to the process in step S404. In a case where it is decided that the connection release request is made from that electronic device 3 ("YES" in step S408), the CPU 41 releases the communication connection with that electronic device 3 (step S409) and returns to the process in step S401.

In a case of shifting to a power saving operation mode because of capacity shortage of the battery 71, in a case of shifting to the airplane mode, in a case of acquiring a termination command from the user explicitly and in any other similar cases, execution of the communication control processing is terminated by releasing the communication connection by executing an interrupt operation.

MODIFIED EXAMPLES

Next, modified examples of respective processing will be described.

Figure 8:
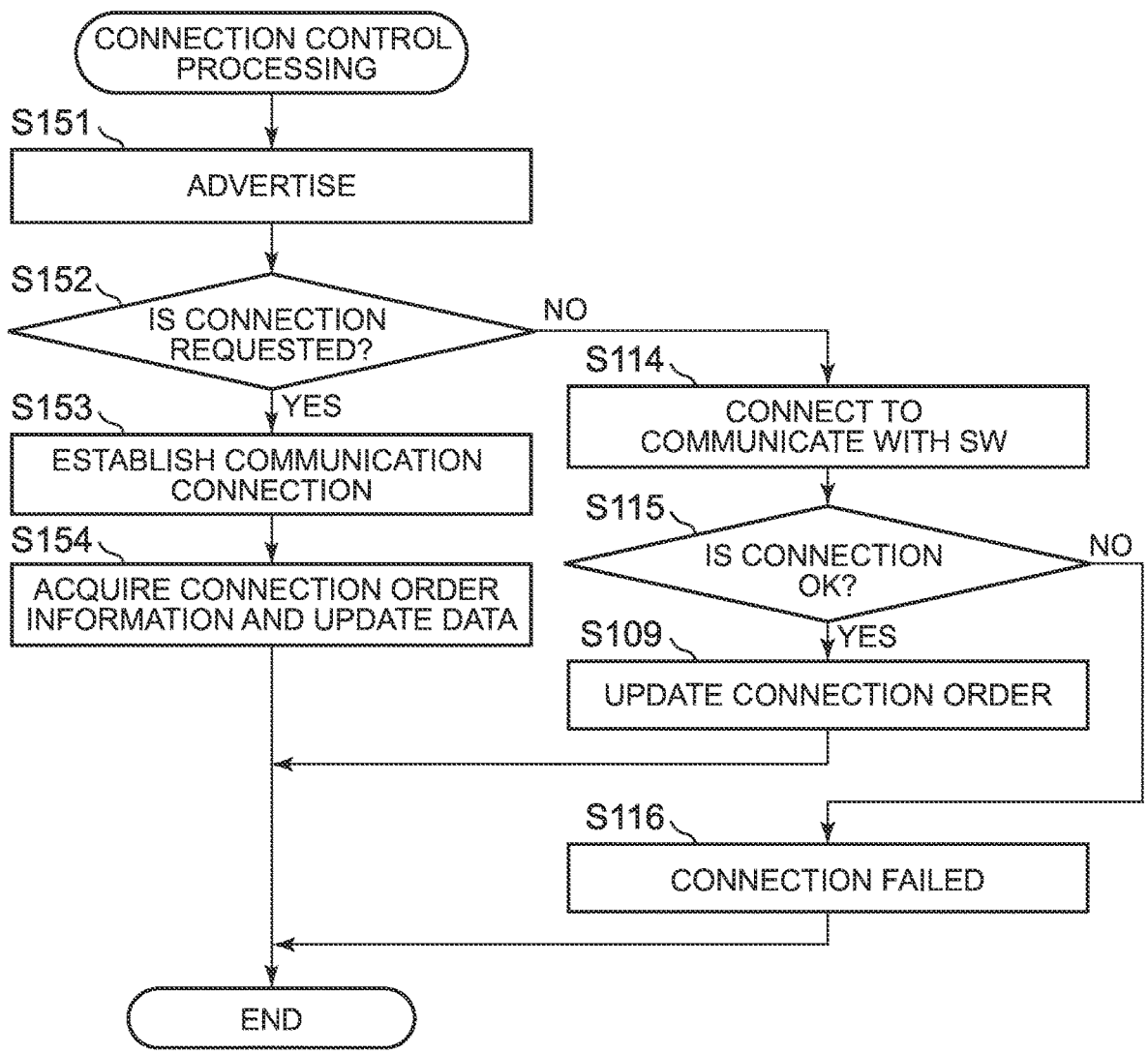
FIG. 8 is a flowchart illustrating one modified example of the connection control processing which is executed by the electronic device.

FIG. 8 is a flowchart illustrating one modified example of the connection control processing that the electronic device 3 executes.

In a case where only the downmost-stream side electronic device 3 searches for other electronic devices 3 as described in explanation of the communication control processing in FIG. 6, it is not necessary for the electronic device which is to be newly connected to search for the downmost-stream-side electronic devices 3 in turn and therefore connection control is facilitated. In the connection control processing in this modified example, since contents of the processes in steps S109, S114 to S116 are the same as those of the corresponding processes in the connection control processing in the first embodiment, detailed description thereof is omitted simply by assigning the same numerals to these processes.

The CPU 11 makes the own device execute advertising via the communication unit 24 (detection of the request is made possible in a mode other than the BLE) (step S151). The CPU 11 decides whether the connection request is made from other electronic devices 3 (step S152). In a case where it is decided that no connection request is made ("NO" in step S152), the CPU 11 shifts to a process in step S114. The CPU 11 makes the own device search for the arm-worn type device 2 (the smartwatch) via the communication unit 24 and makes the own device connect to communicate with the arm-worn type device 2 in a case where the arm-worn type device 2 is found (step S114).

In a case where it is decided that the communication connection request is made from another electronic device 3 (that is, the downmost-stream side electronic device 3b) ("YES" in step S152), the CPU 11 makes the own device establish the communication connection with the downmost-stream side electronic device 3 (step S153). The CPU 11 acquires the connection order data from the upstream-side electronic device 3 which is connected to communicate with the own device, updates the connection order data by adding the own device to the tail end of the connection order and reflects the updated connection order data in the identification list 122 (step S154). Then, the CPU 11 terminates execution of the connection control processing.

The processes in step S152 and step S153 configure the control step (the control procedure of the program 121) of a communication controlling method in the first embodiment of the present invention.

Although in the communication control processing in the first embodiment, the upstream-side electronic device 3 simply transfers the data which is transmitted to and received from the downstream-side electronic device 3, the uppermost-stream side electronic device 3 may make it possible to decide whether data transfer is possible and to adjust a data transfer timing (to decide whether prompt data transfer is necessary).

Figure 9:
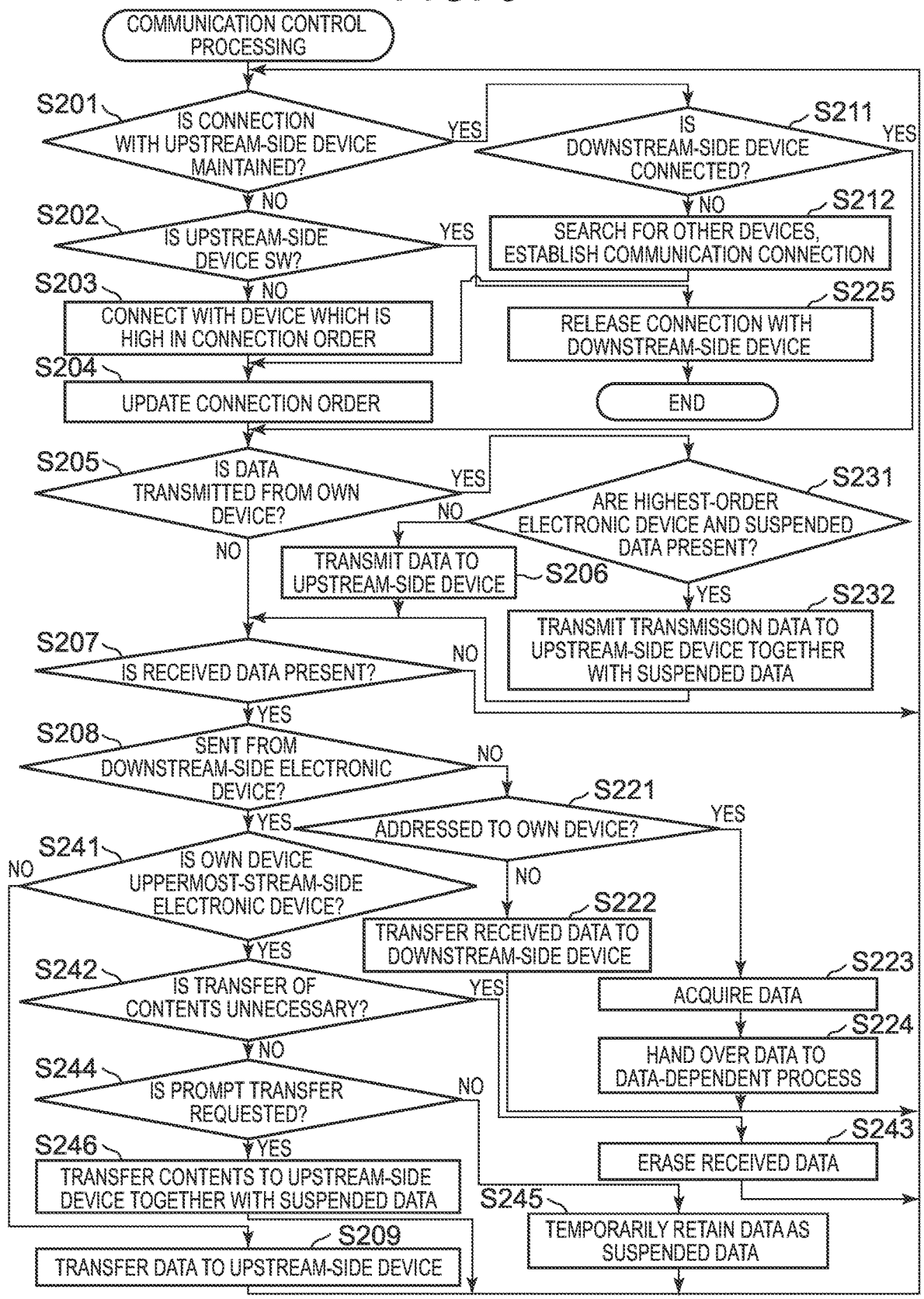
FIG. 9 is a flowchart illustrating one modified example of the communication control processing which is executed by the electronic device.

FIG. 9 is a flowchart illustrating a modified example of the communication control processing which is illustrated in FIG. 6 and is executed by the electronic device 3.

In the communication control processing in the modified example, processes in steps S231, S232, S241 to S246 are newly added, in addition to the processes in the communication control processing in the first embodiment. Other processes are the same as those in the processing in FIG. 6 and therefore detailed description thereof is omitted simply by assigning the same numerals to the same process contents.

In a case where the flow is branched to "YES" in the decision process in step S205, the CPU 11 decides whether the own device is the highest-order electronic device (that is, the own device is connected to directly communicate with the arm-worn type device 2) and whether there exists the suspended data 124 (step S231). In a case where it is decided that the own device is not the highest-order electronic device or there exists no suspended data 124 ("NO" in step S231), the CPU 11 shifts to the process in step S206. In a case where it is decided that the own device is the highest-order electronic device and there exists the suspended data 124 ("YES" in step S231), the CPU 11 transmits the transmission data to the upstream-side device together with the suspended data 124 at an appropriate timing (step S232). Then, the CPU 11 shifts to the process in step S207.

In a case where the flow is branched to "YES" in the decision process in step S208, the CPU 11 decides whether the own device is the highest-order electronic device (step S241). In a case where it is decided that the own device is not the highest-order electronic device ("NO" in step S241), the CPU 11 shifts to the process in step S209.

In a case where it is decided that the own device is the highest-order electronic device (the communication connection between the own device and the arm-worn type device 2 is established) ("YES" in step S241), the CPU 11 analyzes the contents of the transmission data which is received and decides whether the data is data which is not necessary to transfer (whether transmission of the data is necessary) (step S242). As data which is not necessary to transfer, for example, data that contents thereof are the same as contents of data which is separately transmitted from the own device and so forth and, therefore, plural-time transmission of that data has no meaning, data which has no meaning in a case where the direct communication connection is not established such as data which is used for achieving time synchronization and so forth are given. A list of these kinds of data whose transfer is not necessary may be stored and retained in the memory 12 in advance. In a case where it is decided that transfer of that data is not necessary ("YES" in step S242), the CPU 11 erases (does not transmit) the received data (step S243) and returns to the process in step S201. Incidentally, in a case where it is not necessary to achieve direct synchronization between the arm-worn type device 2 and the electronic device 3b and, instead, it is necessary to achieve synchronization between the electronic device 3b and the electronic device 3a, the CPU 11 may operate to send back necessary data to the electronic device 3b at an appropriate timing. In addition, in a case where the transmission data is erased because of overlapping with data which is separately transmitted from the own device, data which is received from the arm-worn type device 2 in response to data which is transmitted from the own device may be transmitted to the electronic device 3b which is the transmission source by executing a process in step S224 and so forth.

In a case where it is decided that transfer of the received data is not unnecessary ("NO" in step S242), the CPU 11 decides whether prompt transfer of the received data is necessary (possible) (step S244). In the example in FIG. 9, prompt transfer of the received data is performed in a case where the CPU 41 of the arm-worn type device 2 normally operates (in accordance with operating conditions of the arm-worn type device 2) or in a case where promptness is important judging from the contents such as a telephone incoming call notice and so forth. Information on an operation mode of the CPU 41 may be acquired via communication in a case where the operation of the CPU 41 is stopped and in a case where the operation is started again. In a case where prompt notification is necessary (possible) ("YES" in step S244), the CPU 11 transfers the received data to the upstream-side device, that is, the arm-worn type device 2 together with contents of the suspended data 124 in a case where the suspended data 124 is present (step S246). The transferred suspended data 124 is deleted. Then, the CPU 11 returns to the process in step S201.

In a case where prompt data transfer is not necessary (possible), that is, in a case where the arm-worn type device 2 is in a power saving operation mode and so forth and therefore the operation of the CPU 41 is stopped or is in an intermittently operated state and so forth in the power saving operation mode and so forth and, in addition, in a case where it is decided that prompt notification of contents such as a mail arrival notice, a notice of updating an application program which is installed in the arm-worn type device 2 and so forth is not necessary ("NO" in step S244), the CPU 11 operates to temporarily retain the received data as the suspended data 124 and suspends transmission of that received data (step S245). In a case where another suspended data is already present, the newly received data is added to this suspended data. Then, the CPU 11 returns to the process in step S201.

The electronic device 3 in the first embodiment includes the communication unit 24 which performs Bluetooth-based communication, the memory 12 which stores data on the electronic devices 3 which are communicable with the arm-worn type device 2 via the communication units 24 in a state of being contained in the identification list 122, and the CPU 11 which, in a case where the communication connection is established between the arm-worn type device 2 and any one of the electronic devices 3 which are contained in the identification list 122, operates to perform data transmission and reception between the own device and the arm-worn type device 2 via another electronic device 3 that the communication connection with the arm-worn type device 2 is established.

Also, in a case where the arm-worn type device 2 and the plurality of electronic devices 3 mutually exchange data in this way, the number of the electronic devices 3 which is really connected to the arm-worn type device 2 is only one and therefore a communication load on the arm-worn type device 2 is not increased. Accordingly, it becomes possible to perform necessary data communication properly between the arm-worn type device 2 and the electronic device 3 while more reducing the power consumption of the arm-worn type device 2.

In addition, in a case where the direct communication connection is established between the own device and the arm-worn type device 2, the CPU 11 operates to perform the first transfer operation of establishing the communication connection between the own device and another electronic device 3b which is contained in the identification list 122, receiving the transmission data which is transmitted from another electronic device 3b to the arm-worn type device 2 from another electronic device 3b and transmitting the transmission data to the arm-worn type device 2 and the second transfer operation of receiving the transmission data which is transmitted from the arm-worn type device 2 to another electronic device 3b from the arm-worn type device 2 and transmitting the transmission data to another electronic device 3b. That is, the electronic device 3a which is directly connected to the arm-worn type device 2 transfers the data which is transmitted and received between the arm-worn type device 2 and another electronic device 3b. Since one electronic device 3a controls data exchanging which is performed between the arm-worn type device 2 and another electronic device 3b in this way, communication with the arm-worn type device 2 is performed in a simply controlled state.

In addition, in a case where the communication connection is established between the arm-worn type device 2 and the first electronic device 3a which is contained in the identification list 122 other than the own device, the CPU 11 operates to establish the communication connection between the own device and the second electronic device 3b (may be the same as the first electronic device 3a) that data transmission and reception between the own device and the arm-worn type device 2 are made possible lastly via the first electronic device 3a in the electronic devices 3 which are contained in the identification list 122 and to perform data transmission and reception between the own device and the arm-worn type device 2 via the second electronic device 3b and the first electronic device 3a. In addition, the CPU 11 operates to establish the communication connection with the third electronic device 3b which is in a state where data transmission and reception between itself (the device 3b) and the arm-worn type device 2 are not yet made possible and the communication connection is made possible and to perform the first transfer operation and the second transfer operation on the third electronic device 3b.

Since the communication connection between each of the electronic device 3 and another electronic device 3b which is located on the downstream side thereof is made possible and thereby each electronic device 3 and another electronic device 3b are connected in series with each other, each electronic device 3 only needs to transfer the data simply from the downstream side to the upstream side and therefore the load on each electronic device 3 is suppressed.

In addition, transmission and reception of data which is received from the third electronic device 3b by the first transfer operation that the third electronic device 3b performs and transmission and reception of data which is received from the first electronic device 3a which is defined as a target of the second transfer operation by the third electronic device 3b are contained in the first transfer operation and the second transfer operation. That is, three or more electronic devices 3 may be connected in series with one another and it becomes possible to perform data transmission and reception with ease between/among the arm-worn type device 2 and the plurality of electronic devices 3 by the same transfer operation in principle no matter how many electronic devices 3 are mutually connected.

In addition, connection order data on the communication connection between the arm-worn type device 2 and each of other electronic devices 3 is contained in the identification list 122 and in a case where the communication connection is established between the own device and one of other electronic devices 3 or the arm-worn type device 2, the CPU 11 operates to update the identification list 122. In a case where the series-connection order is changed and in any other case, it becomes possible for the CPU 11 to acknowledge a change destination with ease by retaining the identification list 122. In addition, the electronic device 3 whose connection order is changed updates the data by itself and sends the updated data to other electronic devices 3 and thereby it becomes possible for the CPU 11 to surely obtain the updated data while the own device is being connected to another electronic device 3.

In addition, as indicated in the modified example, in a case where the communication connection is established between the own device and the arm-worn type device 2, the CPU 11 may decide whether prompt transfer of the transmission data which is received from another electronic device 3b so as to be transmitted to the arm-worn type device 2 is necessary and in a case where prompt data transfer is not necessary, the CPU 11 may hold transmission of that transmission data until a timing that another piece of data is transmitted comes. In data which is transmitted via Bluetooth, data to be promptly transmitted such as the telephone incoming call notice and so forth and data prompt transmission of which is not necessary are contained in a mixed state. It becomes possible to reduce frequency of transmission of tangible data (the data other than control data which pertains to maintenance of the communication connection) to the arm-worn type device 2, rather by sending the data prompt transfer of which is not necessary together with other data at one time.

In particular, the CPU 11 decides whether holding of transmission of the transmission data which depends on decision of necessity of the prompt transfer of the transmission data is necessary depending on the operating conditions of the arm-worn type device 2. Whether the prompt transfer of the transmission data is performed may be decided not only depending on promptness of the transmission data to the arm-worn type device 2 but also depending on whether the arm-worm type device 2 is in a situation where sequential data reception causes no trouble. Data transmission is not delayed more than necessary by making the switch depending on the operating conditions of the arm-worn type device 2.

In particular, the arm-worn type device 2 in the first embodiment includes the CPU 41 and the communication unit 61 that Bluetooth-based communication is possible, makes it possible to stop the operation of the CPU 41 while periodically transmitting and receiving the control data which is used for maintenance of the communication connection with the communication unit 24 of the electronic device 3 (3a, 3b) via the communication unit 61, and in a case where the CPU 41 does not operate, performs such holding of data transmission as described above.

In the arm-worn type device 2 which makes it possible to intermittently stop the operation of the CPU 41 in this way, execution of a process of frequently restarting the operation of the CPU 41 many times is not so preferable. Accordingly, in a case where the operation of the CPU 41 is stopped, it becomes possible to perform batch processing by one-time start of the CPU 41 by transmitting such data which is low in promptness as described above at one time and thereby it becomes possible to increase operating efficiency and to reduce the power consumption of the arm-worn type device 2.

In addition, in a case where the communication connection is established between the own device and the arm-worn type device 2, the CPU 11 decides whether transmission of the transmission data which is received from another electronic device 3b to the arm-worn type device 2 is necessary, and in a case where it is decided that data transmission to the arm-worn type device 2 is not necessary, the CPU 11 operates so as not to transmit the transmission data to the arm-worn type device 2.

In a case where data transmission and reception are performed between/among the arm-worn type device 2 that one user has and the plurality of the electronic devices 3, the electronic device 3a may analyze the contents of the transmission data thereby to attain deduplication and to exclude data which is meaningless in contents even when the transmission request is made from the electronic device 3b which is not directly connected to communicate with the arm-worn type device 2. As a result, it may become possible to increase efficiency of the operation of the arm-worn type device 2 and to reduce the load thereon without making the arm-worn type device 2 perform unnecessary processing.

In addition, in a case where transmission data whose contents are the same as the contents of the transmission data whose transmission to the arm-worn type device 2 is decided to be unnecessary is transmitted to the arm-worn type device 2, the CPU 11 of the electronic device 3a operates to transmit data which is received from the arm-worn type device 2 in response to that data transmission to the electronic device 3b which is a transmission source of the transmission data whose transmission is decided to be unnecessary. That is, it becomes possible to return appropriate information to the electronic device 3b while increasing efficiency of the data transmission and reception between the arm-worn type device 2 and the electronic device 3a by controlling such that the electronic device 3a transmits data which is a replay to the transmission data which is the same as that data in contents to the transmission source of the data which is excluded for avoidance of duplicate transmission as described above.

In addition, the arm-worn type device 2 in the first embodiment includes the communication unit 61 that communication with the external electronic device 3 is possible via Bluetooth and the CPU 41 which does not operate to connect the own device to communicate with another electronic device 3b in a case where the communication connection with any one of the electronic devices 3a is established. In a case where data is transmitted to the external electronic device 3a via the communication unit 61, the CPU 41 operates to contain identification information which is used for specifying one electronic device 3 which is the final transmission destination in that data. In the communication system 1 in the first embodiment, although the destination of the data which is transmitted from the arm-worn type device 2 is limited to the electronic device 3a, there are cases where the electronic device 3 which requests data reply in fact is different from the electronic device 3a, and therefore it becomes possible for each electronic device 3 to decide whether the data is addressed to that electronic device 3 itself with ease and, in addition, whether any transfer operation is to be performed by containing this final replay destination in the payload of the replay data.

In addition, the communication system 1 in the first embodiment has the electronic devices 3 and the arm-worn type device 2. Owing to such a combination as above, even in a case where the number of the electronic devices 3 which transmit data to the arm-worn type device 2 and receive data from the arm-worn type device 2 is pluralized, the number of the electronic devices 3a which is necessary for the arm-worn type device 2 to maintain communication is limited to one and therefore a communication maintaining operation that the arm-worn type device 2 performs is facilitated and low-loaded.

In addition, a communication controlling method for the electronic device 3 in the first embodiment includes the step of controlling such that in a case where data transmission and reception via the communication unit 24 is started between the arm-worn type device 2 and any one of the electronic devices 3 and, in addition, in a case where the communication connection is established between the arm-worn type device 2 and any one of the electronic devices 3 which are contained in the identification list 122, data transmission and reception are performed between that electronic device 3 and the arm-worn type device 2 via another electronic device 3a that the communication connection with the arm-worn type device 2 is established. It becomes possible to suppress a load which is exerted on the arm-worn type device 2 by performing a communication controlling operation to the amount which is exerted on only one electronic device 3a by not connecting second and subsequent electronic devices 3 to communicate with the arm-worn type device 2 in this way and thereby it becomes possible to reduce a communication load.

In addition, it becomes possible to perform data transmission and reception efficiently between/among the arm-worn type device 2 and the plurality of electronic devices 3 while suppressing an increase in communication load on the arm-worn type device 2, in a state of maintaining a general hardware configuration as it is, by installing the program 121 which pertains to the communication controlling method and then controlling a communication connection destination and the communication operation. In particular, since what is necessary is to operate the plurality of electronic devices 3 simply by installing the common program 121 into the plurality of electronic devices 3, it becomes possible to make the communication controlling methods uniform at a low cost and with ease.

Second Embodiment

Figure 10:
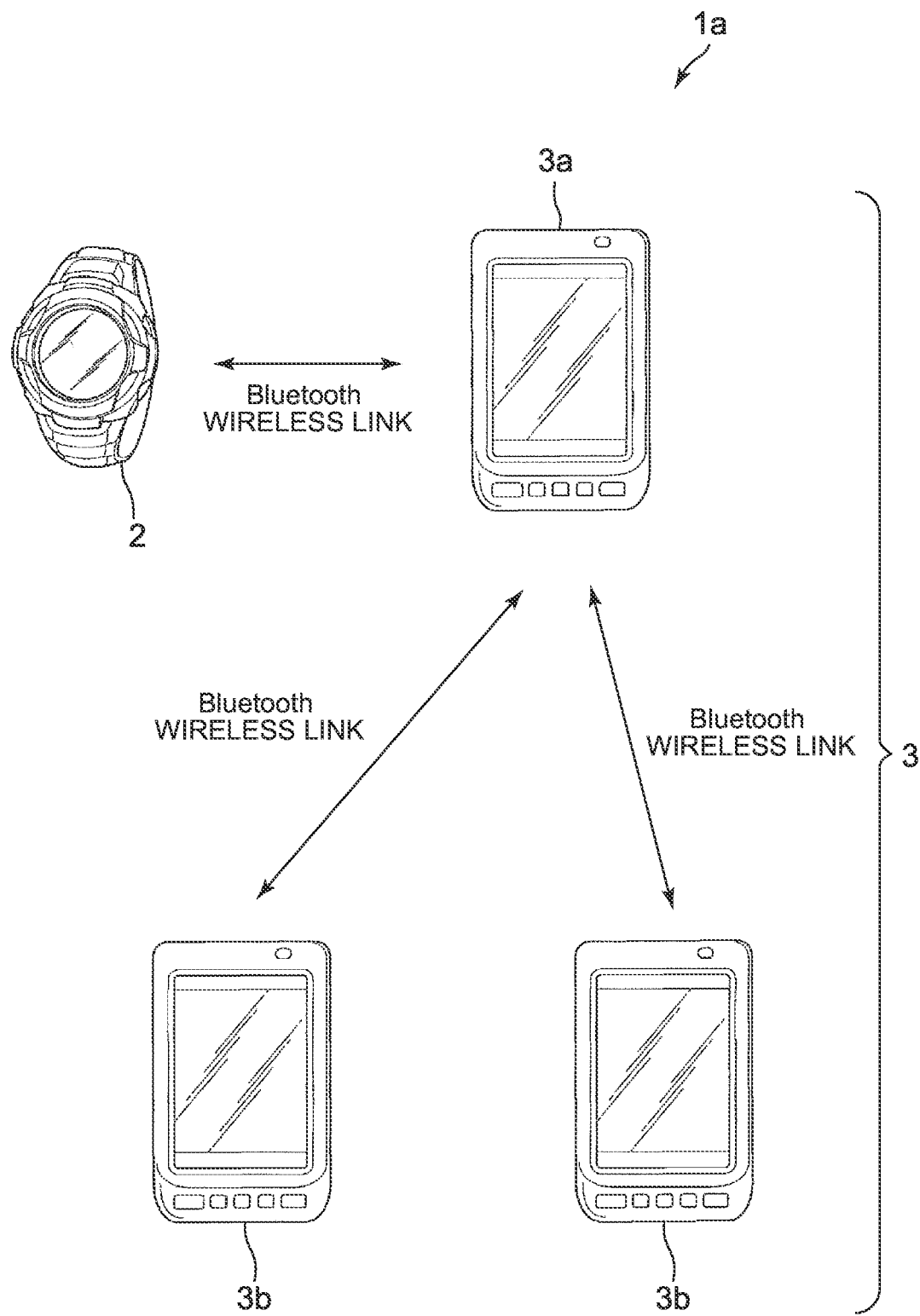
FIG. 10 is an explanatory diagram illustrating one example of a communication system in a second embodiment of the present invention.

FIG. 10 is a diagram illustrating one example of a communication system 1a in the second embodiment.

The arm-worn type device 2 and the electronic devices 3 which configure the communication system 1a are the same as those of the communication system 1 in the first embodiment. In the communication system 1a, each of the plurality of electronic devices 3b is connected to the electronic device 3a which is directly connected to the arm-worn type device 2.

Functional configurations of the arm-worn type device 2 and the electronic devices 3 are the same as those which are illustrated in FIG. 2 and FIG. 3 and therefore description thereof is omitted on condition that, in the following, the same numerals will be used.

A communication operation of the communication system 1a will be described.

In the communication system 1a, in a case where one electronic device 3 which performs data transmission and reception in cooperation with the arm-worn type device 2 newly emerges, it is sufficient for that electronic device 3 that the electronic device 3a which is directly connected to the arm-worn type device 2 be detected. That is, decision of whether the electronic device 3b which is connected to the electronic device 3a is present, the identification information on the electronic device 3b and so forth are not necessary.

Figure 11:
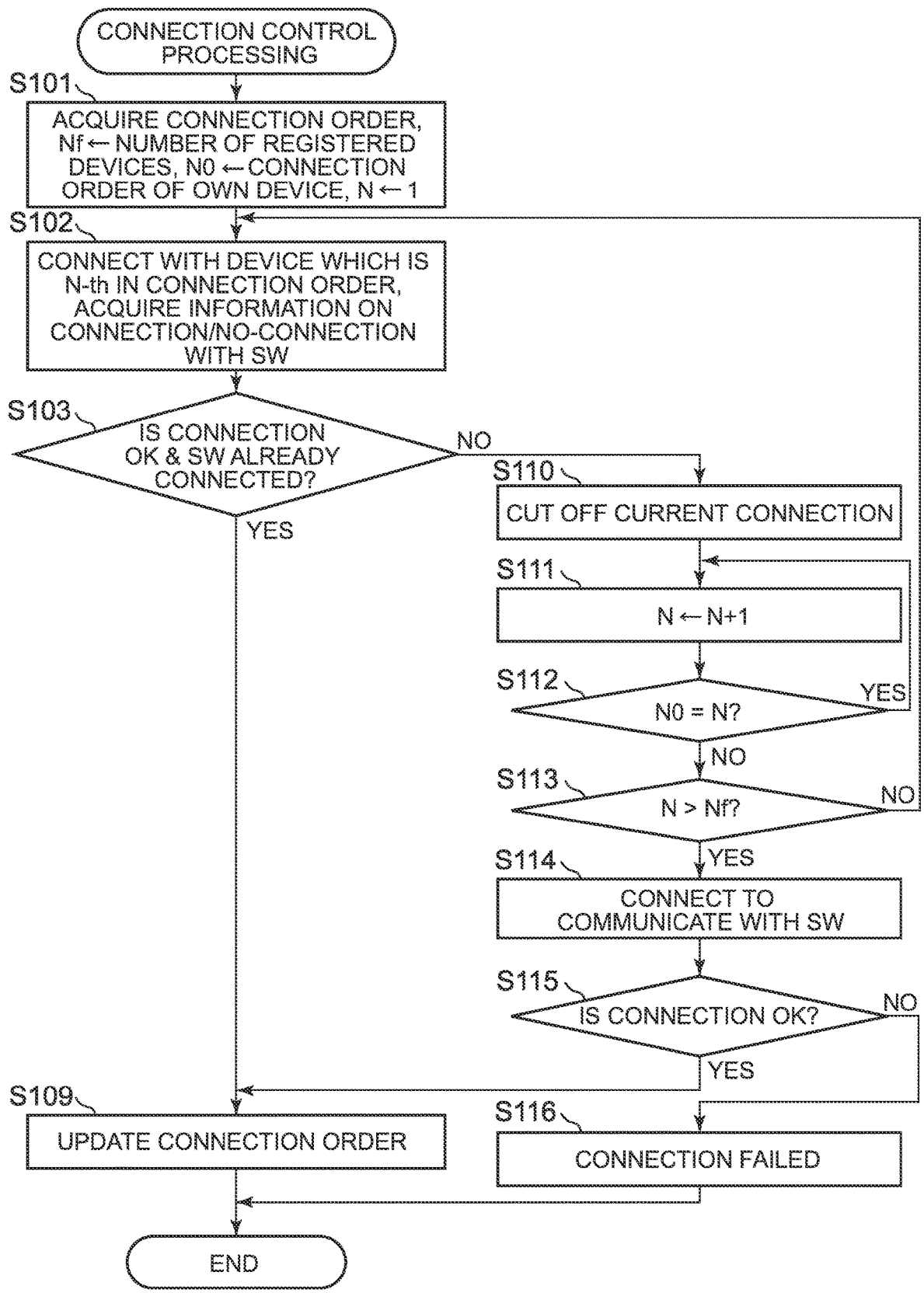
FIG. 11 is a flowchart illustrating one example of a control procedure of connection control processing which is executed by the electronic device in the communication system in the second embodiment of the present invention.

FIG. 11 is a flowchart illustrating one example of a control procedure by the CPU 11 in connection control processing that the electronic device 3 executes in the communication system 1a in the second embodiment.

In this connection control processing, processes which correspond to processes in step S104 to step S108 in the connection control processing (FIG. 5) that the electronic device 3 executes in the communication system 1 in the first embodiment are deleted. Other processes are the same as those in the first embodiment and are designated by the same numerals.

In this connection control processing, in a case where the arm-won type device 2 succeeds in connection with the electronic device 3 which is the N-th in the connection order and it is decided that the N-th electronic device 3 is connected to communicate with the arm-worn type device 2 (the smartwatch) in the decision process in step S103 ("YES" in step S103), the CPU 11 shifts to the process in step S109 in a state of maintaining the communication connection as it is.

Incidentally, similarly to the connection control processing in the modified example which is illustrated in FIG. 8, the N-th electronic device 3 may simply wait for reception of the connection request from the electronic device 3a without actively searching for the uppermost stream-side electronic device 3a (by executing advertising in the BLE mode).

Figure 12:
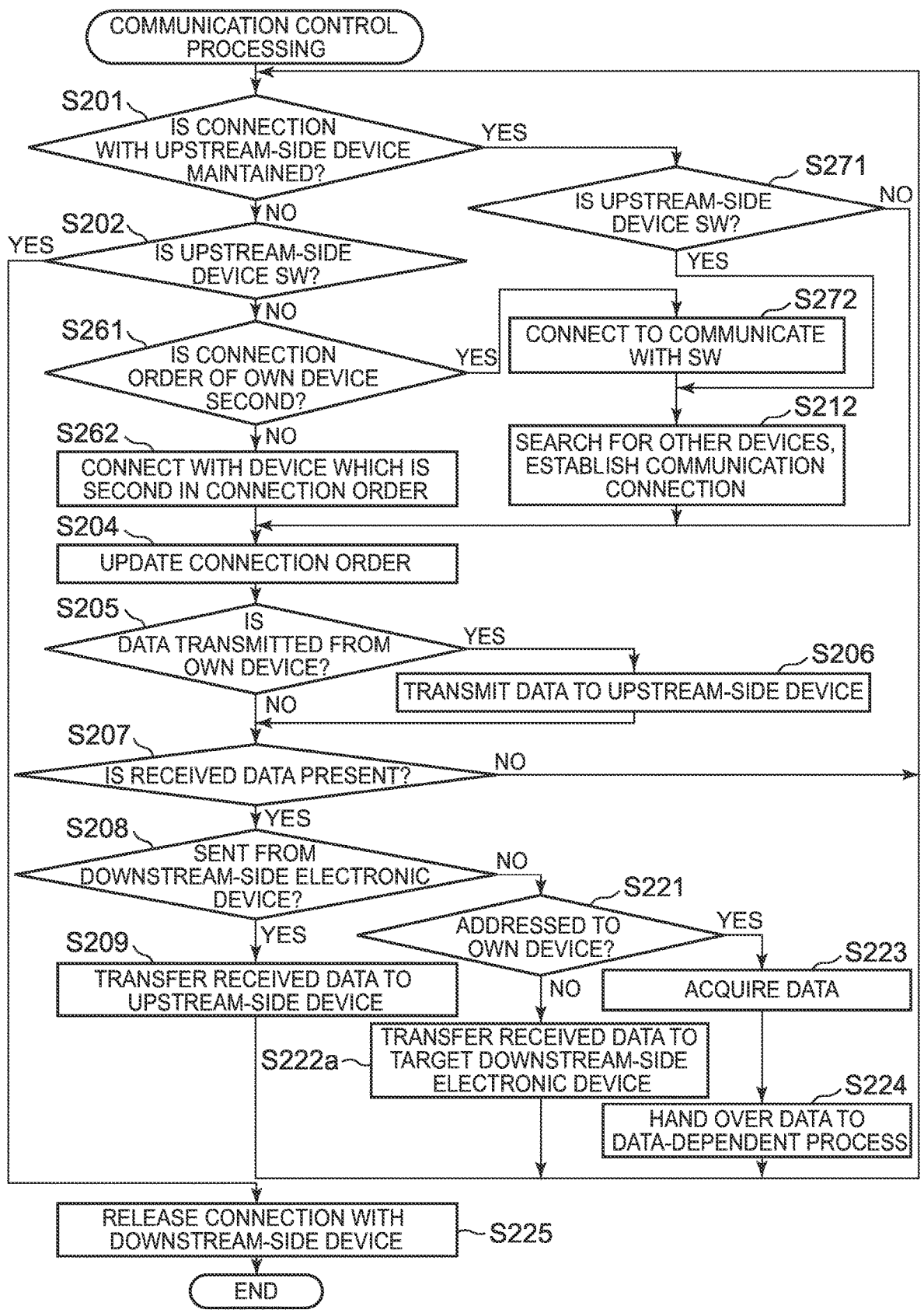
FIG. 12 is a flowchart illustrating one example of a control procedure of communication control processing which is executed by the electronic device in the communication system in the second embodiment of the present invention.

FIG. 12 is a flowchart illustrating one example of a control procedure by the CPU 11 in communication control processing which is executed by the electronic device 3 in the communication system 1a in the second embodiment.

In this communication control processing, the processes in step S203 and step S211 in the communication control processing (FIG. 6) which is executed by the electronic device 3 in the communication system 1 in the first embodiment are deleted and processes in steps S261, S262, S271 and S272 are added. In addition, the process in step S222 is replaced with a process in step S222a. Since other processes are the same as those in FIG. 6 and therefore the same processing contents are designated by the same numerals.

In the decision process in step S201, in a case where it is decided that connection with the upstream-side device is maintained and the flow is branched to "YES", the CPU 11 decides whether the arm-worn type device 2 (the smartwatch) is connected to the upstream side of the own device (step S271). In a case where it is decided that the upstream-side device is not the arm-worn type device 2 ("NO" in step S271), the CPU shifts to the process in step S204.

In a case where it is decided that the upstream-side device is the arm-worn type device 2 ("YES" in step S271), the CPU 11 shifts to the process in step S212.

In a case where it is decided that the upstream-side device is not the arm-worn type device 2 in the decision process in step S203 in a situation where connection with the upstream-side device is being cut off and the flow is branched to "NO", the CPU 11 decides whether the connection order of the own device is the second (step S261). In a case where it is decided that the connection order of the own device is not the second ("NO" in step S261), the CPU 11 makes the own device connect to communicate with the electronic device 3 which is the second in connection order via the communication unit 24 (step S262). Then, the CPU 11 shifts to the process in step S204.

In a case where it is decided that the connection order of the own device is the second in the decision process in step S261 ("YES" in step S261), the CPU 11 makes the own device establish the communication connection with the arm-worn type device 2 via the communication unit 24 (step S272). Then, the CPU 11 shifts to a process in step S212.

In a case where, in the decision process in step S221, it is decided that the received data is not sent from the downstream-side electronic device 3 (sent from the arm-worn type device 2) and the flow is branched to "NO", the CPU 11 operates to transfer the received data to the downstream-side electronic device 3 which corresponds to the final transmission destination of the received data (step S222a). Then, the CPU 11 returns to the process in step S201.

In the communication system 1a in the second embodiment, in a case where the communication connection is established between the arm-worn type device 2 and the first electronic device 3a which is contained in the identification list 122 other than the own device in this way, the CPU 11 establishes the communication connection between the own device and the first electronic device 3a and performs data transmission and reception between the own device and the arm-worn type device 2 via the first electronic device 3a. That is, since the CPU 11 makes the electronic device 3a that direct communication connection with the arm-worn type device 2 is established perform all transfer operations between the arm-worn type device 2 and other electronic devices 3b, the number of the transfer operations to be performed is reduced to one and it becomes possible to reduce a delay time which is taken for data transfer. In addition, since connection with two or more electronic devices 3 is unnecessary except the electronic device 3a and adjustment of the connection order is also unnecessary, it is easy to control the communication connection.

Incidentally, the present invention is not limited to the above embodiments and modified examples and it is possible to modify the present invention in a variety of ways. For example, although in the first and second embodiments, description is made on the assumption that other electronic device 3b are serially or intensively connected to the electronic device 3a which is firstly connected to the arm-worn type device 2, the plurality of electronic devices 3b may be connected to some of the electronic devices 3a and 3b thereby to establish a tree-shaped connection. In this case, the upstream-side electronic device 3 surely holds the latest connection order data and selects a transfer destination or transfers data to all the transfer destinations all at once.

In addition, in the above embodiments, description is made on the assumption that the electronic devices 3 are connected in order that data transmission and reception between the arm-worn type device 2 and each of the electronic devices 3 is started. However, also an example that each priority degree and so forth are set to each electronic device 3 in such a manner that the connection order of each electronic device 3 is changed to be set on the upstream side even in a case where data transmission and reception to and from that electronic device 3 are started later may be included. In a case where the electronic device 3 which performs data transmission and reception only for a short period of time is located on the upstream side, since the connection order is changed on the upstream side every time that the data transmission and reception to and from that electronic device 3 are terminated and data transfer is interrupted, in particular, in a case where the number of the electronic devices 3 is large, adjustment may be performed in such a manner that the connection order is changed first in accordance with the priority degree and the priority order is liable to be changed on the downstream side.

In addition, although in the above embodiments, description is made on the assumption that it is possible for the CPU 41 of the arm-worn type device 2 to temporarily stop the operation independently of the communication unit 61, the arm-worn type device 2 may not have such a configuration. In addition, the arm-worn type device 2 may be a device that the CPU 41 is set as a main-CPU and a sub-CPU which performs other minor processing is included.

In addition, the electronic device 3a may be of a type of performing either decision of necessity or unnecessity of prompt data transfer or decision of necessity or unnecessity of data transfer. In addition, in a case where prompt data transfer is not necessary, that the data concerned is allowed to be transferred together with which data may be designated. In addition, in a case where data is deleted for reason that transfer of that data is unnecessary, a response to transmission of the data of the same contents may not be necessarily sent to the transmission source depending on importance of the contents and so forth.

As for consent or refusal of analysis of transmission data which pertains to the decisions of necessity or unnecessity of prompt transfer of the data, necessity or unnecessity of transfer of the data and so forth that the electronic device 3a performs, setting may be changeable in accordance with the inputting operation which is performed by using the operation acceptance unit 21. The propriety of various decisions may be determined depending on consent or refusal of the analysis.

In addition, setting of communication intervals and so forth pertaining to the communication connection between the arm-worn type device 2 and the electronic device 3a may be different from setting of communication intervals and so forth pertaining to the communication connection between/ among the electronic devices 3. In addition, in the communication between/among the electronic devices 3, individual data which is not sent to the arm-worn type device 2 such as, for example, data which is transmitted and received in order to achieve timing synchronization and so forth may be contained as necessary, not limited to data which is transferred to be exchanged between the arm-worn type device 2 and the electronic device 3.

In addition, although in the above embodiments, description is made by taking the arm-worn type device 2 such as the smartwatch and so forth as an example of the body-worn type device, the body-worn type device is not limited to the arm-worn type device 2. The device may be a device which is battery-driven for a long time and measures various biological information which is necessary for sufficiently suppressing heat generation and, in addition, the device may be of the type of being worn on, for example, the head, the neck, the body, the upper arm, the leg and so forth. In addition, the body-worn type device may be another kind of the arm-worn type device and may be an activity tracker, an electronic wristwatch and so forth other than the smartwatch.

In addition, it is possible to mutually combine various configurations and the control procedures which are described in the first and second embodiments and the modified examples thereof optionally in so far as these configurations and control procedures do not mutually conflict.

In addition, although description is made by taking the memory 12 which is configured by the nonvolatile memory such as an HDD (Hard Disc Drive), an SSD (Solid State Drive), a flash memory and so forth as examples of the computer readable medium which stores the program 121 which pertains to the communication control processing in the present invention, the computer readable medium is not limited to the above examples. It is also possible to apply other nonvolatile memories such as an MRAM (Magneto-resistive Random Access Memory) and so forth and portable storage media such as a CD-ROM (Compact Disc Read Only Memory), a DVD (Digital Versatile Disc) and so forth. In addition, as a medium for providing data on the program which pertains to the present invention via a communication line, a carrier wave is also applied to the present invention.

In addition, it is possible to appropriately change the concrete configurations, the contents and the procedures of the processing operations which are described in the embodiments and the modified examples thereof within the range not deviating from the gist of the present invention.

Although the embodiments of the present invention and the modified examples thereof are described, the scope of the present invention is not limited to the above embodiments and the modified examples thereof and includes the scope of the invention which is described in the appended patent claims and the scope of the equivalent thereof.

What is claimed is:

1. An electronic device comprising:
 a transceiver which performs communication via short-range wireless communication;
 a memory which stores identification data on electronic devices which are communicable with a body-worn type device via the transceiver; and
 a processor which, in a case where communication connection is established between the body-worn type device and any one of the electronic devices which are contained in the identification data, makes the transceiver perform data transmission and reception between the own device and the body-worn type device via another electronic device that the communication connection with the body-worn type device is established.

2. The electronic device according to claim 1, wherein
 in a case where direct communication connection is established between the own device and the body-worn type device, the processor operates to perform a first transfer operation of establishing the communication connection between the own device and another electronic device which is contained in the identification data, receiving transmission data which is transmitted from the another electronic device to the body-worn type device from the another electronic device and transmitting the transmission data to the body-worn type device and a second transfer operation of receiving data which is transmitted from the body-worn type device to the another electronic device from the body-worn type device and transmitting the received data to the another electronic device.

3. The electronic device according to claim 2, wherein the processor,
 in a case where the communication connection is established between the body-worn type device and a first electronic device which is contained in the identification data other than the own device, operates to establish the communication connection between the own device and a second electronic device that data transmission and reception between itself and the body-worn type device are made allowable lastly via the first electronic device in the electronic devices which are contained in the identification data and then operates to perform data transmission and reception between the own device and the body-worn type device via the second electronic device and the first electronic device, and operates to establish the communication connection between the own device and a third electronic device which is in a state where data transmission and reception between itself and the body-worn type device are not yet made possible and the communication connection with the own device is made possible and to perform the first transfer operation and the second transfer operation on the third electronic device.

4. The electronic device according to claim 3, wherein transmission and reception of data which is received from the third electronic device by the first transfer operation that the third electronic device performs and transmission and reception of data which is received from the first electronic device which is defined as a target of the second transfer operation by the third electronic device are contained in the first transfer operation and the second transfer operation.

5. The electronic device according to claim 3, wherein connection order data on the communication connection between each of the first, second and third electronic devices and the body-worn type device is contained in the identification data, and in a case where the communication connection is established between the own device and one of the first, second and third electronic devices or the body-worn type device, the processor operates to update the connection order data to the order of the communication connection.

6. The electronic device according to claim 2, wherein in a case where the communication connection is established between the body-worn type device and a first electronic device which is contained in the identification data other than the own device, the processor operates to establish the communication connection between the own device and the first electronic device and to perform data transmission and reception between the own device and the body-worn type device via the first electronic device.

7. The electronic device according to claim 1, wherein in a case where the communication connection is established between the own device and the body-worn type device, the processor decides whether prompt transfer of the transmission data which is received from that another electronic device and is be transmitted to the body-worn type device is preferable, and in a case where prompt data transfer is not preferable, the processor holds transmission of the transmission data until a timing that another piece of data is transmitted comes.

8. The electronic device according to claim 7, wherein the processor decides whether holding of transmission of the transmission data which depends on decision of preferability of the prompt transfer of the transmission data is preferable, depending on an operating condition of the body-worn type device.

9. The electronic device according to claim 8, wherein the body-worn type device includes a second processor and a second transceiver that Bluetooth-based communication is allowable, and makes it allowable to stop an operation of the second processor while periodically transmitting and receiving control data which is used to maintain communication connection via the second transceiver and holds transmission of the transmission data in a case where the second processor does not operate.

10. The electronic device according to claim 1, wherein in a case where the communication connection between the own device and the body-worn type device is established, the processer decides whether transmission of transmission data which is received from that another electronic device to be transmitted to the body-worn type device is preferable, and in a case where it is decided that data transmission to the body-worn type device is not preferable, the processor does not operate to transmit the transmission data to the body-worn type device.

11. The electronic device according to claim 10, wherein in a case where transmission data whose contents are the same as the contents the transmission data whose transmission is decided to be not preferable is transmitted to the body-worn type device, the processor operates to transmit the data which is received from the body-worn type device in response to that data transmission to the electronic device which is a transmission source of the transmission data whose transmission is decided to be not preferable.

12. A body-worn type device comprising:
a second transceiver that communication with an external electronic device is allowable via short-range wireless communication; and
a second processor which does not perform communication connection with another electronic device in a case where communication connection with any one of electronic devices is established, wherein
in a case where data is transmitted to the external electronic device via the second transceiver, the second processor contains identification information used for specifying one electronic device which is a final transmission destination in the data.

13. A communication system comprising:
an electronic device which includes
a transceiver which performs communication via short-range wireless communication,
a memory which stores identification data on electronic devices which are communicable with a body-worn type device via the transceiver, and
a processor which, in a case where communication connection is established between the body-worn type device and any one of the electronic devices which are contained in the identification data, makes the own device perform data transmission and reception between the own device and the body-worn type device via another electronic device that the communication connection with the body-worn type device is established; and
the body-worn type device which includes
a second transceiver which is communicable with external electronic devices via Bluetooth, and
a second processor which, in a case where communication connection with any one of the electronic devices is established, does not make the own device connect to communicate with other electronic devices, wherein
in a case where data is transmitted to the external electronic devices via the second transceiver, the second processor contains identification information used for specifying one electronic device which is a final transmission destination in the data.

14. A communication controlling method of an electronic device which includes a transceiver which performs communication via short-range wireless communication and a memory which stores identification data on the electronic devices which are communicable with a body-worn type device via the transceiver, comprising the step of:

controlling such that, in a case where the communication connection is established between the body-worn type device and any one of the electronic devices which are contained in the identification data, data transmission and reception are performed between the electronic device and the body-worn type device via another electronic device that the communication connection with the body-worn type device is established.

15. A storage medium which stores a program which makes a computer of an electronic device which includes a transceiver which performs communication via short-range wireless communication and a memory which stores identification data on electronic devices which are communicable with a body-worn type device via the transceiver function as a control unit which, in a case where communication connection is established between the body-worn type device and any one of the electronic devices which are contained in the identification data, controls to perform data transmission and reception between any one of the electronic devices and the body-worn type device via another electronic device that communication connection with the body-worn type device is established.

* * * * *